United States Patent
Otero et al.

(10) Patent No.: US 9,256,590 B2
(45) Date of Patent: Feb. 9, 2016

(54) FORMULA AND FUNCTION GENERATION AND USE IN ELECTRONIC SPREADSHEETS

(71) Applicant: MICROSOFT TECHNOLOGY LICENSING, LLC, Redmond, WA (US)

(72) Inventors: Carlos Augusto Otero, Seattle, WA (US); John Campbell, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 190 days.

(21) Appl. No.: 14/108,782

(22) Filed: Dec. 17, 2013

(65) Prior Publication Data
US 2015/0169530 A1 Jun. 18, 2015

(51) Int. Cl.
G06F 17/24 (2006.01)
G06F 3/0486 (2013.01)
G06F 17/21 (2006.01)
G06F 3/0484 (2013.01)
(Continued)

(52) U.S. Cl.
CPC ............ G06F 17/246 (2013.01); G06F 3/0486 (2013.01); G06F 3/0488 (2013.01); G06F 3/04842 (2013.01); G06F 17/212 (2013.01); G06F 17/24 (2013.01); G06F 17/245 (2013.01); G06F 17/276 (2013.01)

(58) Field of Classification Search
CPC ..... G06F 17/246; G06F 17/245; G06F 17/24; G06F 17/212; G06F 3/0488; G06F 17/276; G06F 3/0486; G06F 3/04842
See application file for complete search history.

(56) References Cited

U.S. PATENT DOCUMENTS

| | | | |
|---|---|---|---|
| 7,451,397 B2 | 11/2008 | Weber et al. | |
| 2003/0033329 A1 | 2/2003 | Bergman et al. | |
| 2007/0055922 A1* | 3/2007 | Martynov et al. ..... | G06F 17/246 715/210 |

(Continued)

FOREIGN PATENT DOCUMENTS

| | | |
|---|---|---|
| CA | 2850982 A1 | 5/2013 |
| EP | 2555126 A2 | 2/2013 |

OTHER PUBLICATIONS

Gunter, et al., "Chapter 15: Using Formulas and Functions", In Book: Microsoft Office 2008 for Mac Bible, A Wiley Publication, Apr. 1, 2009, 39 Pages.

(Continued)

*Primary Examiner* — Adam M Queler
(74) *Attorney, Agent, or Firm* — Damon Rieth; Tom Wong; Micky Minhas

(57) ABSTRACT

Spreadsheet formula and function creation and use with electronic computing devices are provided. When a user moves content (e.g., a spreadsheet cell) into a spreadsheet formula/function bar, a cell reference for the content may automatically be created and disposed in the formula/function bar, and if a user enters a math operation in a spreadsheet cell, corresponding operation sentence structure (syntax) may be automatically inserted into the formula/function bar. One or more formulas or functions may be automatically suggested as a user begins entering a formula/function. An always visible formula/function guide may be presented or displayed to provide helpful information on arguments/components of a formula/function, and help resources may be provided in a help resources interface with respect to application functionality and spreadsheet formulas/functions.

20 Claims, 25 Drawing Sheets

(51) Int. Cl.
*G06F 3/0488* (2013.01)
*G06F 17/27* (2006.01)

(56) References Cited

U.S. PATENT DOCUMENTS

2013/0067306 A1    3/2013   Bhargav et al.
2015/0169532 A1*   6/2015   Otero .................... G06F 3/0488
                                                        715/212

OTHER PUBLICATIONS

"International Search Report & Written Opinion Issued in PCT Application No. PCT/US2014/069419", Mailed Date: Apr. 28, 2015, 13 Pages.
Napier-Rivers, "Microsoft® Excel® 2013: Working with Formulas and Functions Using a Touch Screen", Published on: May 15, 2013, Available at: http://kbuuk.com/book/1785/microsoft%C2%AE-excel%C2AE-2013:-working-with-formulas-and-functions-using-a-touch-screen.shtml, 4 pages.
"View, Edit & Format Spreadsheets with Quicksheet", Retrieved on: Jul. 19, 2013, Available at: https://support.google.com/quickoffice/answer/2989683?hI=en, 2 pages.
"Use Formula AutoComplete", Retrieved on: Jul. 19, 2013, Available at: http://office.microsoft.com/en-in/excel-help/use-formula-autocomplete-HA010082293.aspx, 3 pages.
"Use Formulas and Functions", Published on: Apr. 2, 2013, Available at: http://www.mscd.edu/technologytraining/documentcenter/googledocs/useformulasandfunctions/, 11 pages.
"Second Written Opinion Issued in PCT Application No. PCT/US2014/069419", Mailed Date: Nov. 9, 2015, 8 Pages.
Napier, Albert, "Microsoft Excel 2013: Working with Formulas and Functions Using a Touch Screen", Retrieved From<<http://038e910.netsolhost.com/wordpress/wp-content/uploads/2015/01/wwff_T_2013-Lesson-1-Sample-Using-Touch-Sample-and-Touch-Screen-Appendix.pdf>> Oct. 5, 2013, 55 Pages.

* cited by examiner

|   | A | B | C | D | E | F | G | H | I |
|---|---|---|---|---|---|---|---|---|---|
| 1 | Item | Amount |  | Category | Amount |  |  |  |  |
| 2 | Room Rental | $800 |  | Office Supplies | $500 |  |  |  |  |
| 3 | Tee Shirts | $120 |  | Books |  |  |  |  |  |
| 4 | Red Square Table Supplies | $150 |  |  |  |  |  |  |  |
| 5 | Cell phone | $45 |  |  |  |  |  |  |  |
| 6 | Printing and copies | $200 |  |  |  |  |  |  |  |
| 7 | Books | $300 |  |  |  |  |  |  |  |
| 8 | Miscellaneous | $300 |  |  |  |  |  |  |  |
| 9 | Monthly Movie Night | $75 |  |  |  |  |  |  |  |
| 10 |  |  |  |  |  |  |  |  |  |
| 11 | Minimum | $45 |  |  |  |  |  |  |  |
| 12 | Average | $238.75 |  |  |  |  |  |  |  |

E3  fx  =VLOOKUP( lookup_value , table_array , col_index_num , range_lookup )

Value found to be in the first column of the table, and can be a value, a reference, or a text string.

FIG. 5A

|    | A | B | C | D | E | F | G | H | I |
|----|---|---|---|---|---|---|---|---|---|
| 1  | Item | Amount |  | Category | Amount |  |  |  |  |
| 2  | Room Rental | $800 |  | Office Supplies | $500 |  |  |  |  |
| 3  | Tee Shirts | $120 |  | Books |  |  |  |  |  |
| 4  | Red Square Table Supplies | $150 |  |  |  |  |  |  |  |
| 5  | Cell phone | $45 |  |  |  |  |  |  |  |
| 6  | Printing and copies | $200 |  |  |  |  |  |  |  |
| 7  | Books | $300 |  |  |  |  |  |  |  |
| 8  | Miscellaneous | $300 |  |  |  |  |  |  |  |
| 9  | Monthly Movie Night | $75 |  |  |  |  |  |  |  |
| 10 |  |  |  |  |  |  |  |  |  |
| 11 | Minimum | $45 |  |  |  |  |  |  |  |
| 12 | Average | $238.75 |  |  |  |  |  |  |  |
| 13 |  |  |  |  |  |  |  |  |  |
| 14 |  |  |  |  |  |  |  |  |  |
| 15 |  |  |  |  |  |  |  |  |  |
| 16 |  |  |  |  |  |  |  |  |  |
| 17 |  |  |  |  |  |  |  |  |  |
| 18 |  |  |  |  |  |  |  |  |  |
| 19 |  |  |  |  |  |  |  |  |  |
| 20 |  |  |  |  |  |  |  |  |  |

E3 | fx | =VLOOKUP( [D3] , [table_array] , [col_index_num] , [range_lookup] )

A table of text, numbers, or logical values, in which data is retrieved. Can be a reference to a range or a range name

FIG. 5B

FORMULA AND FUNCTION GENERATION AND USE IN ELECTRONIC SPREADSHEETS

BACKGROUND

With the advent of computers and computer software, users have become accustomed to receiving, entering, editing, filtering and otherwise utilizing data of various types. Spreadsheet applications have become very popular for allowing users to handle large amounts of data and for performing many different computations and data organization functions. Spreadsheet application users may enter and manipulate large amounts of data with the help of a variety of mathematical and data organizing formulas and functions. Unfortunately, entering and modifying spreadsheet application formulas and functions can be a difficult task for many users owing to the typically unique structure (or, syntax) used by their spreadsheet applications. In addition, with the advent of touch-enabled computing devices, entering and manipulating such formulas and functions using a touch interface often is particularly difficult. And, while many touch-enabled devices provide pop-up soft keyboards, such soft keyboards often consume half or more of the available display space of a given device making entry and use of such formulas and functions frustrating to the user.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing efficient spreadsheet formula and function creation and use with electronic computing devices. According to embodiments, when an electronic spreadsheet document is being utilized, a variety of formulas and functions may be provided, including one or more touch-optimized formulas and functions (hereafter collectively "formula/function"). When a user drags or otherwise moves content (e.g., a spreadsheet cell) into a spreadsheet formula/function bar, a cell reference for the content may automatically be created and disposed in the formula/function bar. If a user enters a math operation in a spreadsheet cell, corresponding operation sentence structure (syntax) may be automatically inserted into the formula/function bar. When a user interacts with spreadsheet content, user intention to create a formula/function may be detected, and formula/function syntax may be automatically suggested or inserted in the formula/function bar. In addition, one or more formulas or functions may be automatically suggested as a user begins entering the first characters of a formula/function.

According to other embodiments, an always visible formula/function bar (also referred to as a formula or function guide) may be presented or displayed to provide helpful information on arguments/components of a formula/function. In addition, help resources may be suggested and/or surfaced in a pane, dialog box or other user interface component for providing help content with respect to application functionality and spreadsheet formulas/functions.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention.

FIG. 3I illustrates the electronic spreadsheet document of FIG. 3H and showing touch interaction with a data item.

FIG. 5A illustrates an electronic spreadsheet document including a variety of data items and showing an always visible formula/function guide.

FIG. 5B illustrates an electronic spreadsheet document including a variety of data items and showing an always visible formula/function guide.

DETAILED DESCRIPTION

Figure 1:
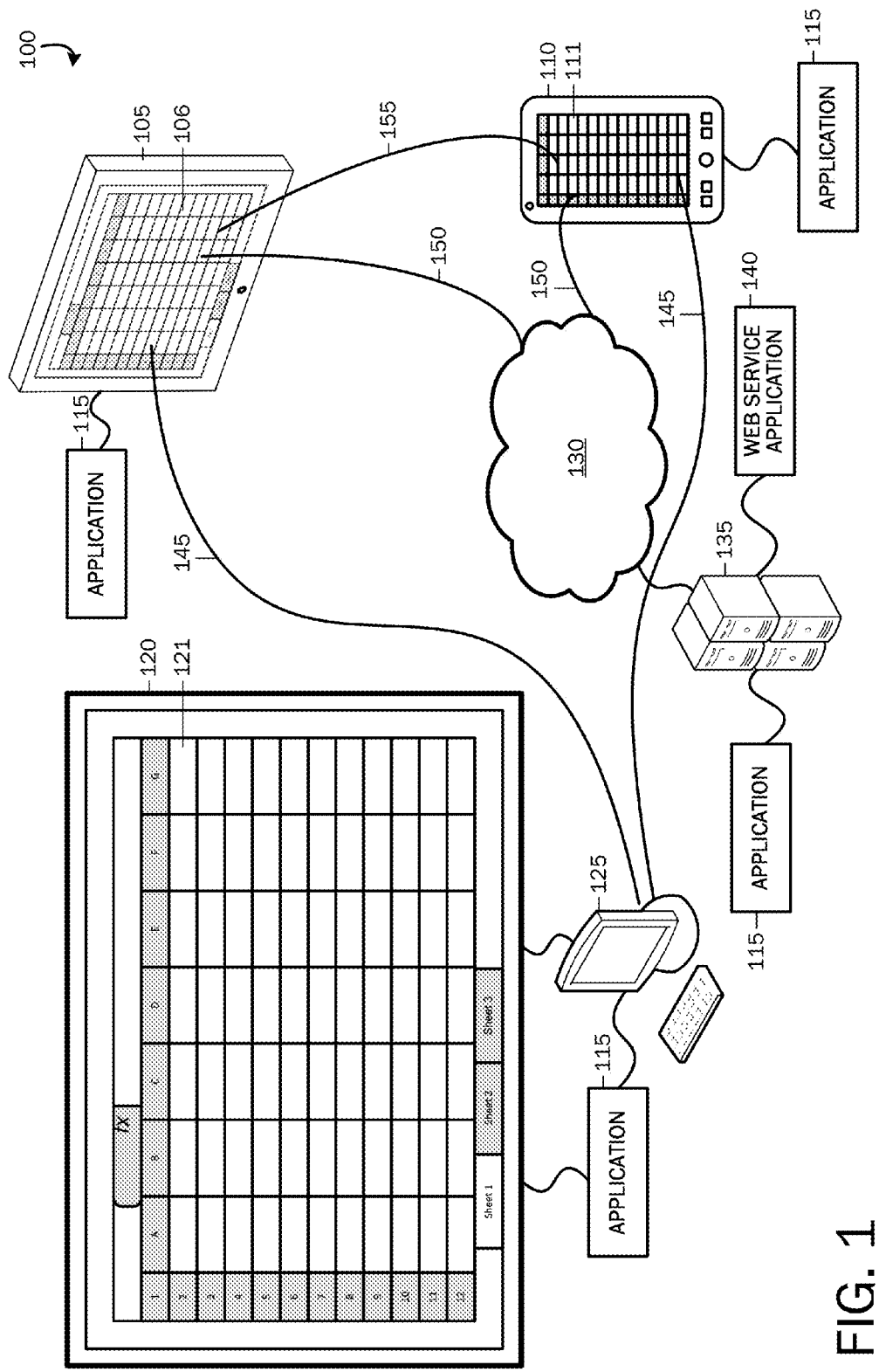
FIG. 1 illustrates a system architecture in which embodiments of the present invention may be practiced.

As briefly described above, embodiments of the present invention are directed to efficient spreadsheet function creation and use with electronic computing devices. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described may be modified by substituting, reordering, or adding stages to the disclosed methods. Accordingly, the following detailed description does not limit the invention but, instead, the proper scope of the invention is defined by the appended claims.

FIG. 1 illustrates a system architecture in which embodiments of the present invention may be practiced. In FIG. 1, a variety of computing devices are illustrated with which embodiments of the present invention may be practiced on individual computing devices or in a collaborative work session. For example, a small-form smartphone or other handheld computing device 110 is illustrated having a display surface 111 and being associated with an application 115. A larger form tablet-style computing device 105 having a display surface 106 and an associated spreadsheet application 115 is illustrated. A large display device 120 having a display surface 121 is illustrated being associated with a computer 125 and a spreadsheet application 115.

As should be appreciated, the computing devices 105, 110, 120, 125 are purposes of illustration only and are not exhaustive of the various types of computing devices that may be used in accordance with embodiments of the present invention. For example, while the display device 120 is illustrated as a display unit with an associated computing device 125, the large-form display device 120 may operate as an integrated display/computing device that may be used for any suitable use from large-scale display uses, for example, in a conference room, to personal computing, as desired. According to embodiments, each of the computing devices illustrated in FIG. 1 may receive input through a variety of suitable means including touch or gesture input, keyboard input, mouse input, voice command input, electronic inking input, eye tracking, and the like.

Referring still to FIG. 1, the software applications 115 illustrated in association with each of the computing devices 105, 110, 120, 125 are illustrative of any application having sufficient computer executable instructions for enabling embodiments of the present invention as described herein. For example, applications 115 may include spreadsheet applications, word processing applications, slide presentation applications, electronic mail applications, notes taking applications, desktop publishing applications, and the like. An example spreadsheet application 115 includes EXCEL manufactured by Microsoft Corporation of Redmond, Wash. As should be appreciated, this example spreadsheet application is but one example of the many applications suitable for enabling embodiments described herein may be used.

Each of the computing devices 105, 110, 120, 125 may operate in a collaborative work environment through one or more wired or wireless data connections 145, 150, 155. That is, each of the computing devices may communicate with each other through wired or wireless data lines via direct connection, or via connection through a distributed computing network 130 such as the Internet or an intranet.

According to embodiments, application functionality associated with each of the computing devices 105, 110, 120, 125 may operate according to one or more variations. For example, each application 115 may be a fully functional "thick" client application having all application functionality including the ability to send and receive data to and from other applications 115 operating on other computing devices in the collaborative work session. Each such application not only has its native functionality, for example, spreadsheet functionality, but according to embodiments of the present invention, each such application also contains sufficient computer executable instructions for allowing each application to operate as a control application for controlling information sent from a control device for receipt by an endpoint display device in a collaborative work environment. Likewise, each such application has sufficient computer executable instructions for allowing the application to operate as an endpoint display device for receiving control functions from another computing device.

According to another embodiment, the computing devices 105, 110, 120, 125 may communicate via a distributed computing network 130, for example, the Internet. Referring still to FIG. 1, the computing device 135 is illustrative of an Internet-based or "cloud-based" server computer on which may be operated one or more web services applications 140 for providing a collaborative work session, as described herein. According to this embodiment, each of the devices 105, 110, 120, 125 may operate as thin client systems, and collaborative communication between the devices may be operated at the direction of the web services application 140 operated at a remote site. According to this embodiment, an application 115 may operate at the remote server 135 wherein each of the devices 105, 110, 120, 125 may access and receive the functionality described herein via a remote service from the server based application 115, for example, via the web services application 140.

Figure 2A:
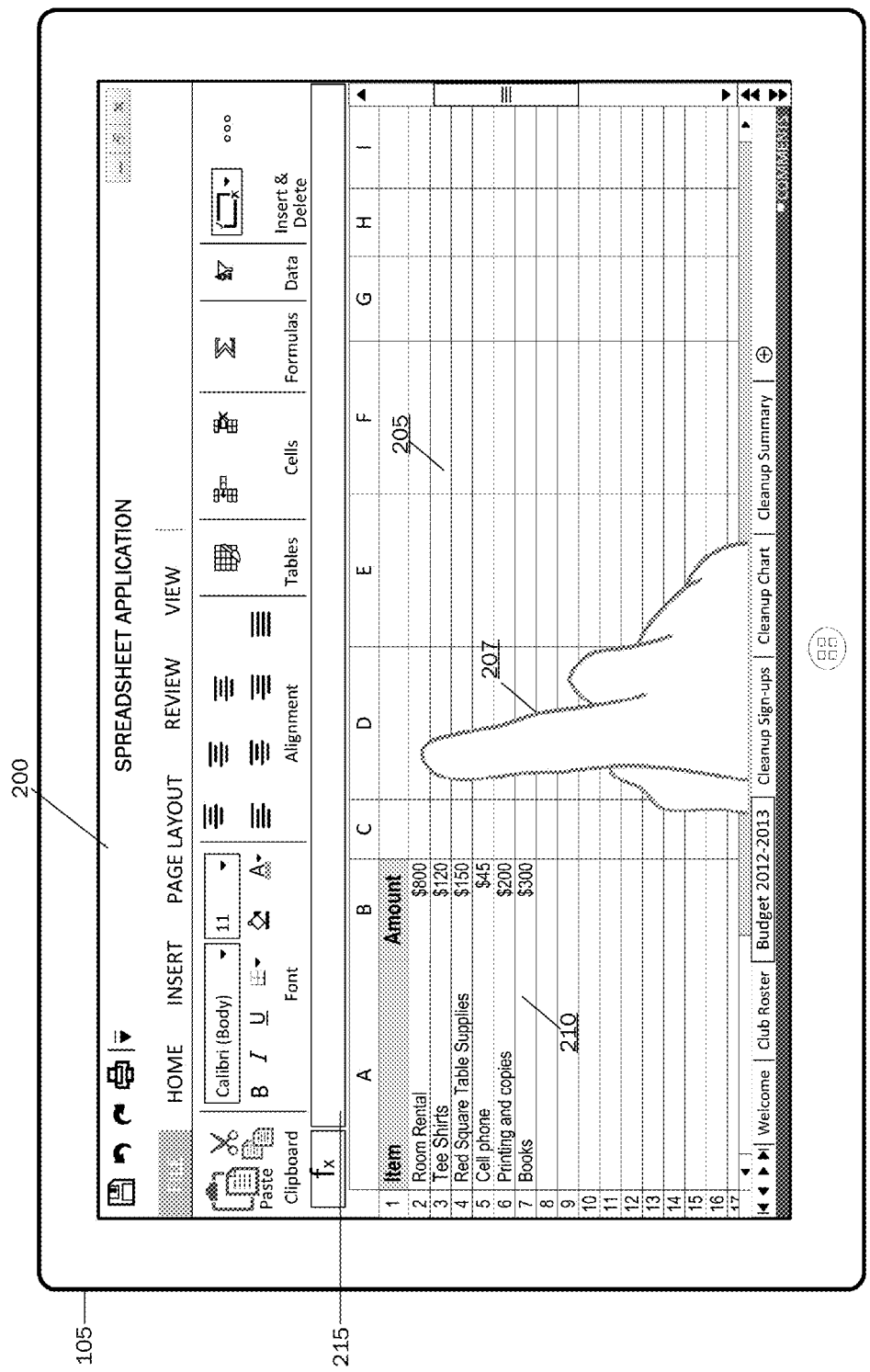
FIG. 2A illustrates an electronic spreadsheet document including a variety of data items.

In FIG. 2A, an example spreadsheet application user interface 200 and spreadsheet document 205 are illustrated that may be displayed on any suitable computing device 105, 110, 120, 125 described above. According to embodiments described herein, user interaction with the electronic spreadsheet user interface 200 and spreadsheet document 205 may be accomplished via a variety of interaction methods including keyboard entry, mouse entry, gesture entry, voice command, eye tracking, thin air gesture entry, electronic inking entry, and/or combinations thereof. The electronic spreadsheet user interface 200 and spreadsheet document 205 are for purposes of example and illustration only and are not exhaustive of the variety of types of documents that may contain data for which embodiments of the present invention may be utilized. For example, while embodiments described herein discuss creation and utilization of spreadsheet-type formulas/functions in terms of their operation in association with data contained in a spreadsheet application document, other software applications and associated documents, for example, word processing documents, slide presentation documents, electronic mail documents, notes documents, and the like that are capable of receiving displaying and allowing operation of spreadsheet-type functions may be utilized in accordance with embodiments of the present invention.

Referring still to FIG. 2A, the example spreadsheet user interface includes a variety of selectable buttons and controls for obtaining and applying functionalities of the underlying spreadsheet application 115 to one or more data items contained in the spreadsheet grid or canvas 205. A formula/function bar 215 is provided in which one or more spreadsheet cell references, mathematical operators, spreadsheet syntax characters, formulas, functions and the like may be entered and/or disposed for generating and utilizing one or more formulas or functions in association with data contained in the spreadsheet document 205. A variety of example data items 210 are illustrated showing a plurality of data names in a column A of the document 205 and showing a variety of numeric data items contained in a column B of the spreadsheet document 205. As should be appreciated, the data illustrated in FIG. 2A is for purposes of example only and is not exhaustive of the vast amounts of data that may be organized in a spreadsheet or other document and for which embodiments of the present invention may be utilized.

Figure 2B:
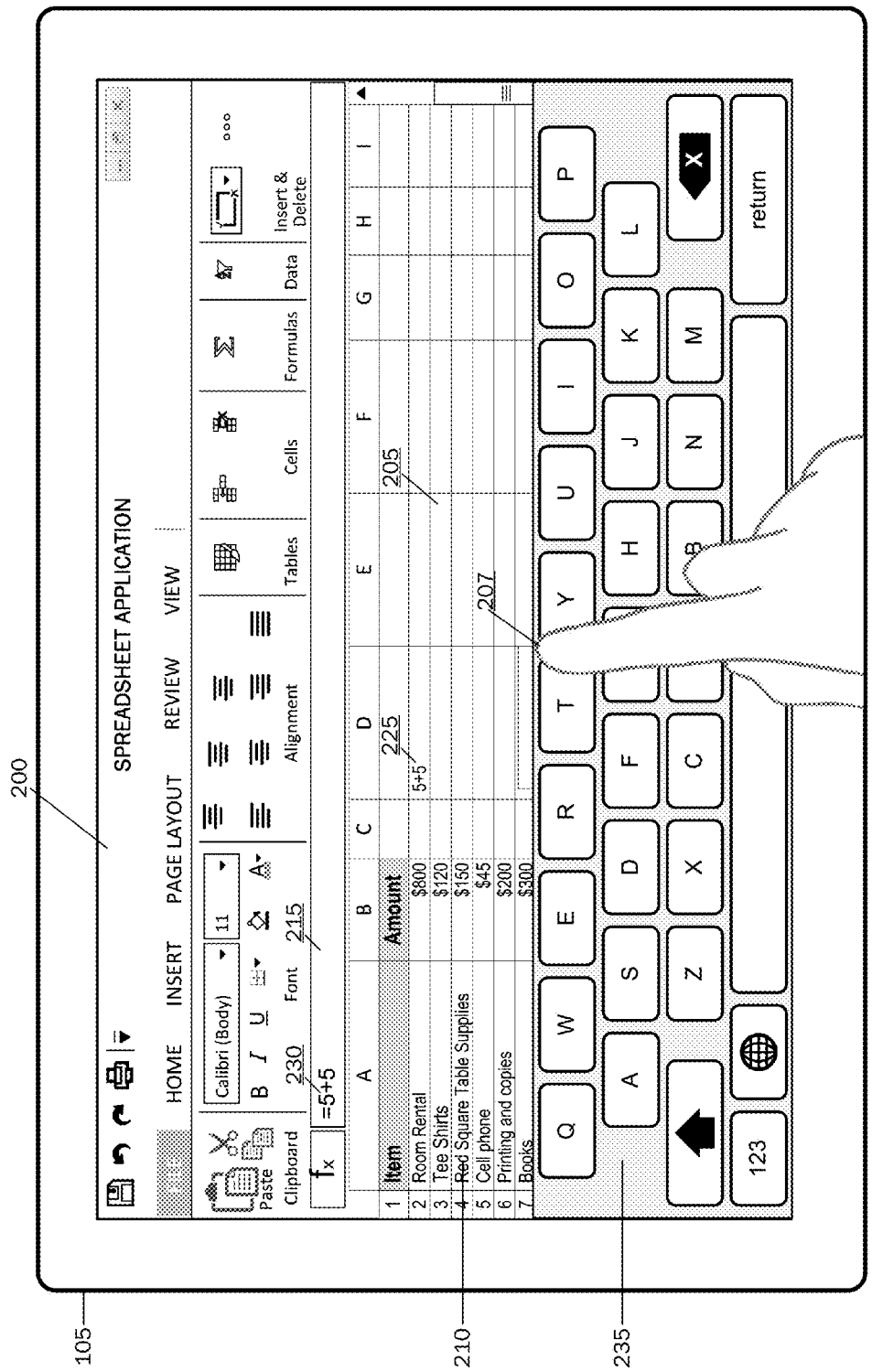
FIG. 2B illustrates an electronic spreadsheet document including a variety of data items and a displayed soft keyboard.

According to embodiments, data may be entered and manipulated in the spreadsheet document 205 via the user interface 200 according to any suitable user interaction method, as described above. As illustrated in FIG. 2A, an example user 207 touches a touch-enabled display surface of the computing device to commence data entry into a desired cell of the example spreadsheet document (e.g., cell D2). Referring now to FIG. 2B, according to one embodiment, in response to the user touch on the display surface of the device, a soft keyboard 235 is launched on the display surface of the device 105 for allowing the user to enter data into the desired spreadsheet cell. As should be appreciated, any of the other described user interaction methods may similarly be utilized for entering data into the desired cell.

Referring still to FIG. 2B, in response to user selection of one or more keys on the disposed soft keyboard, an example data entry 225 of "5+5" is entered in cell D2 of the spreadsheet document 205. As should be appreciated, the data entry 225 entered by the user is for purposes of example only and is not limiting of other data items that may be entered according to embodiments of the present invention. As illustrated in FIG. 2B, as the user enters the example data "5+5", a corresponding entry 230 of "5+5" is entered automatically into the formula/function bar 215.

According to prior methods and systems, if such an entry 225 is entered into a spreadsheet cell, where the entry is not entered according to formula/function syntax expected by the application 115 providing the spreadsheet application user interface 200 and document 205, the entry will be treated as a simple text entry, and after the user ceases interaction with the spreadsheet cell, the entry will be displayed in the cell as a text string, for example, "5+5" as opposed to an intended addition of the two numerals "5" and "5". However, according to embodiments of the present invention, entry of a character string 225, for example, the string "5+5" may be analyzed by the application 115 for determining whether the user is intending a mathematical operation, for example, adding "5" and "5" to generate a result of "10". As should be appreciated, such a determination may be made by reviewing the pattern of character entry to look for such items as a numeral followed by a mathematical operator, for example, plus, minus, divide, equals, etc. If such a pattern is detected, for example, the pattern of "5+5", as illustrated in FIG. 2B, then the application 115 may enter the proper syntax expected by and utilized by the application 115 in the formula/function bar 215 for generating a properly structured mathematical function for carrying out the mathematical operation desired by the user.

Figure 2C:
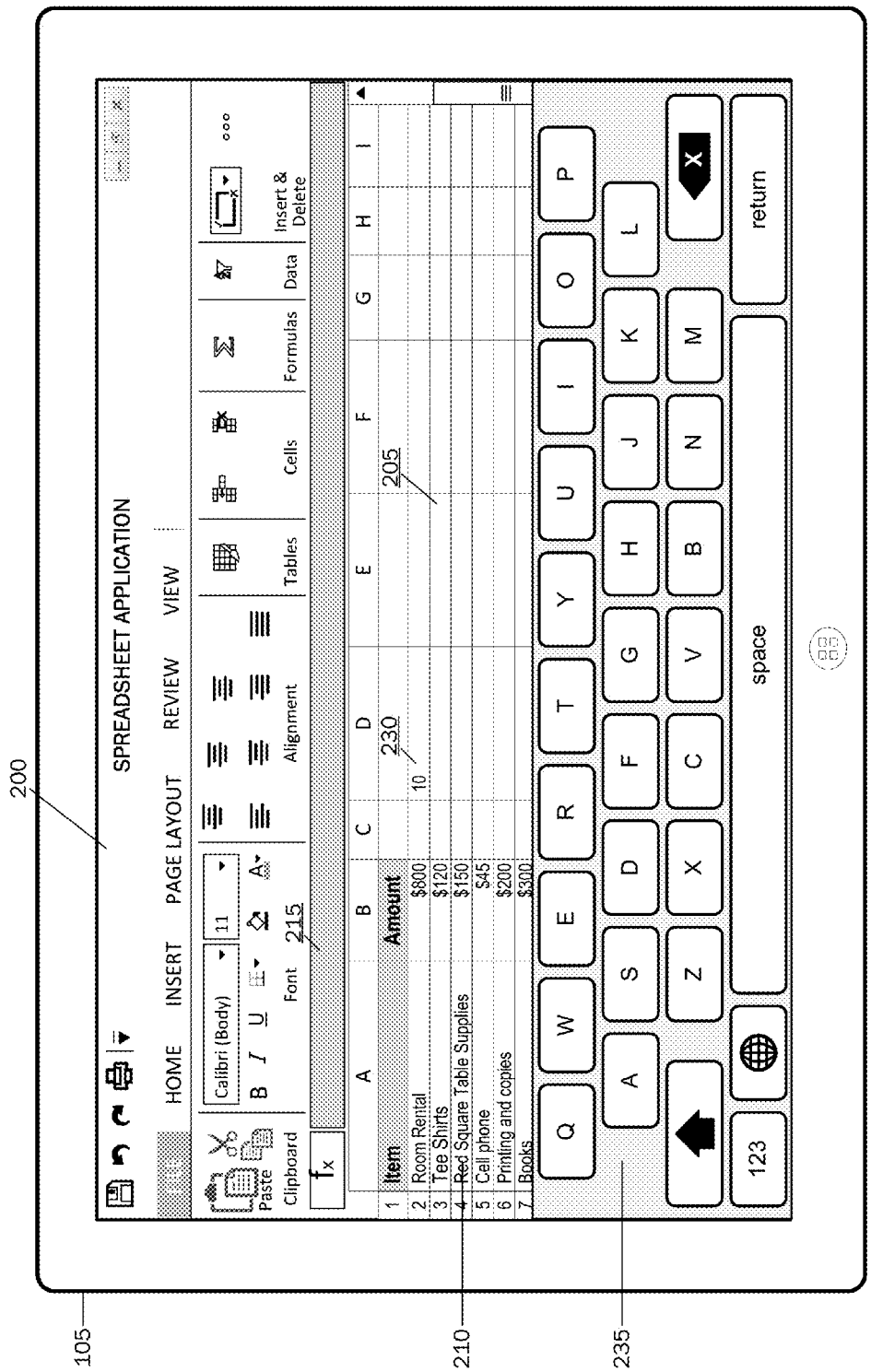
FIG. 2C illustrates an electronic spreadsheet document including a variety of data items and a displayed soft keyboard.

As illustrated in FIG. 2B, entry of "5+5" into cell D2 of the example spreadsheet document 205, results in a syntax of "=5+5" in the formula/function bar 215. If the determined and presented function is accepted by the user, then when the user ceases interaction (i.e. data input) into the associated spreadsheet cell, then the presented mathematical function will be operated, and the result will be displayed in the associated cell, as illustrated in FIG. 2C. That is, as illustrated in FIG. 2C, the entry by the user of "5+5" is determined to be a desired mathematical function of adding "5" to "5", and following the acceptance of a provided syntax of "=5+5" in the formula/function bar 215, the resulting addition to generate the sum of "10" is performed, and the result is displayed in the associated spreadsheet cell. If the mathematical function of "=5+5" is not intended by the user, for example, where the user actually intends to enter the string "5+5" into the desired cell, the user may reject the provided syntax by deleting the provided syntax from the formula/function bar 215 for rejecting application of the offered formula/function syntax to the entered data.

As should be appreciated, the example described above of automatically providing the formula/function syntax of "=5+5" into the formula/function bar 215 is for purposes of example only, and according to embodiments, any number of different formula/function syntax types may be automatically determined for a given data entry and may be presented as illustrated and described above. For example, if a user enters a string such as "5/5", such an entry may be identified as a user's desire to divide "5" by "5", and a corresponding formula/function syntax for performing such a function may be presented in the formula/function bar 215. For another example, if a user enters a text string of "5*5", such a text entry may be interpreted as a desire to multiply "5" times "5", and an appropriate and corresponding formula/function syntax may be provided in the formula/function bar 215 for multiplying "5" times "5". That is, according to embodiments of the present invention, any alphanumeric data entry received in the spreadsheet 205 may be analyzed for mapping to a potential formula, function or mathematical operation that may be offered to the user in the formula/function bar 215. As should be appreciated, where more than one potential mathematical function may be determined for a given data entry, a plurality of potential functions that may be performed on the data entered by the user may be provided in a menu of potential functions to allow the user to select from one of the provided functions for operation on the entered data.

Figure 3A:
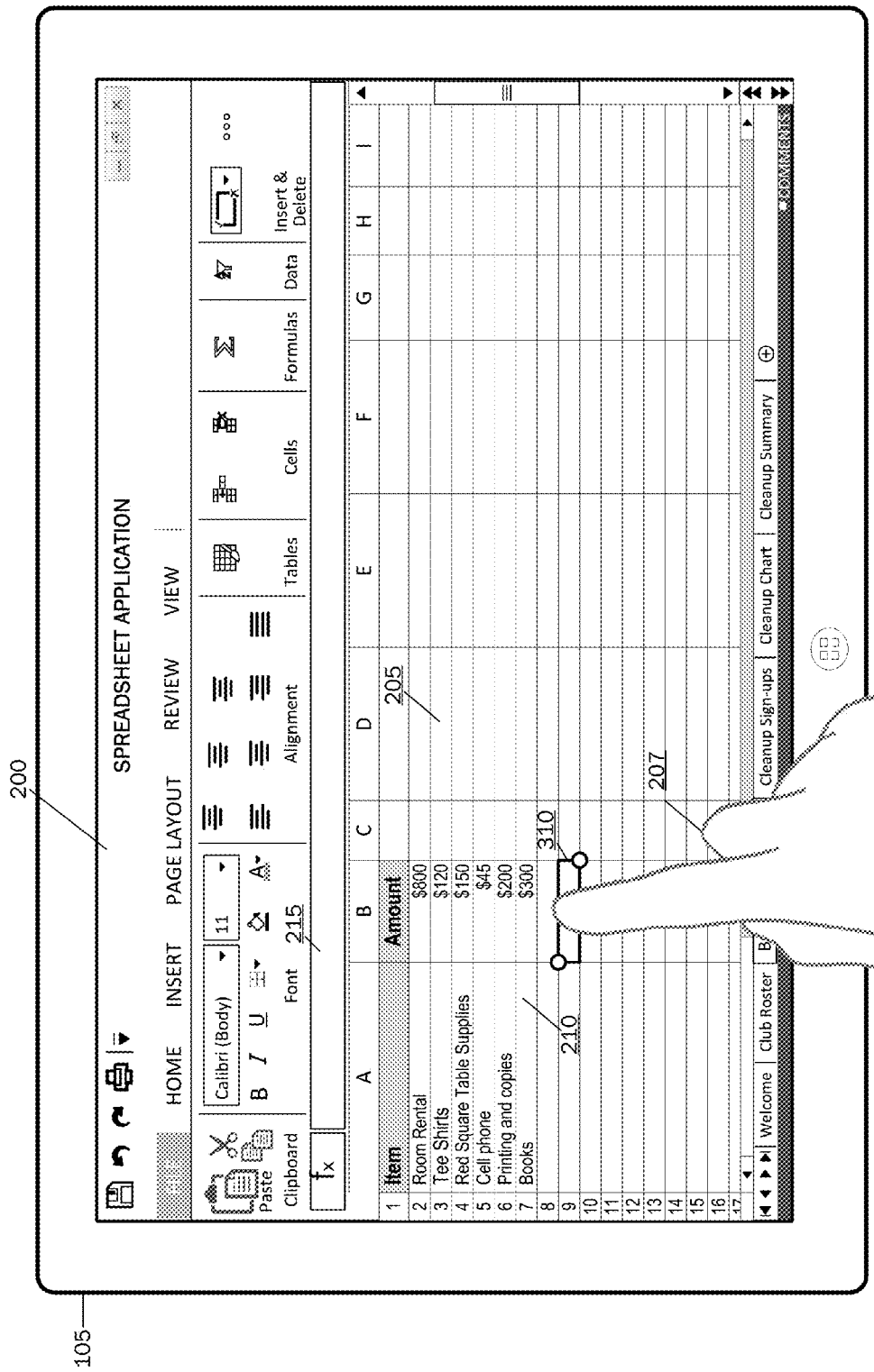
FIG. 3A illustrates an electronic spreadsheet document including a variety of data items.
Figure 3B:
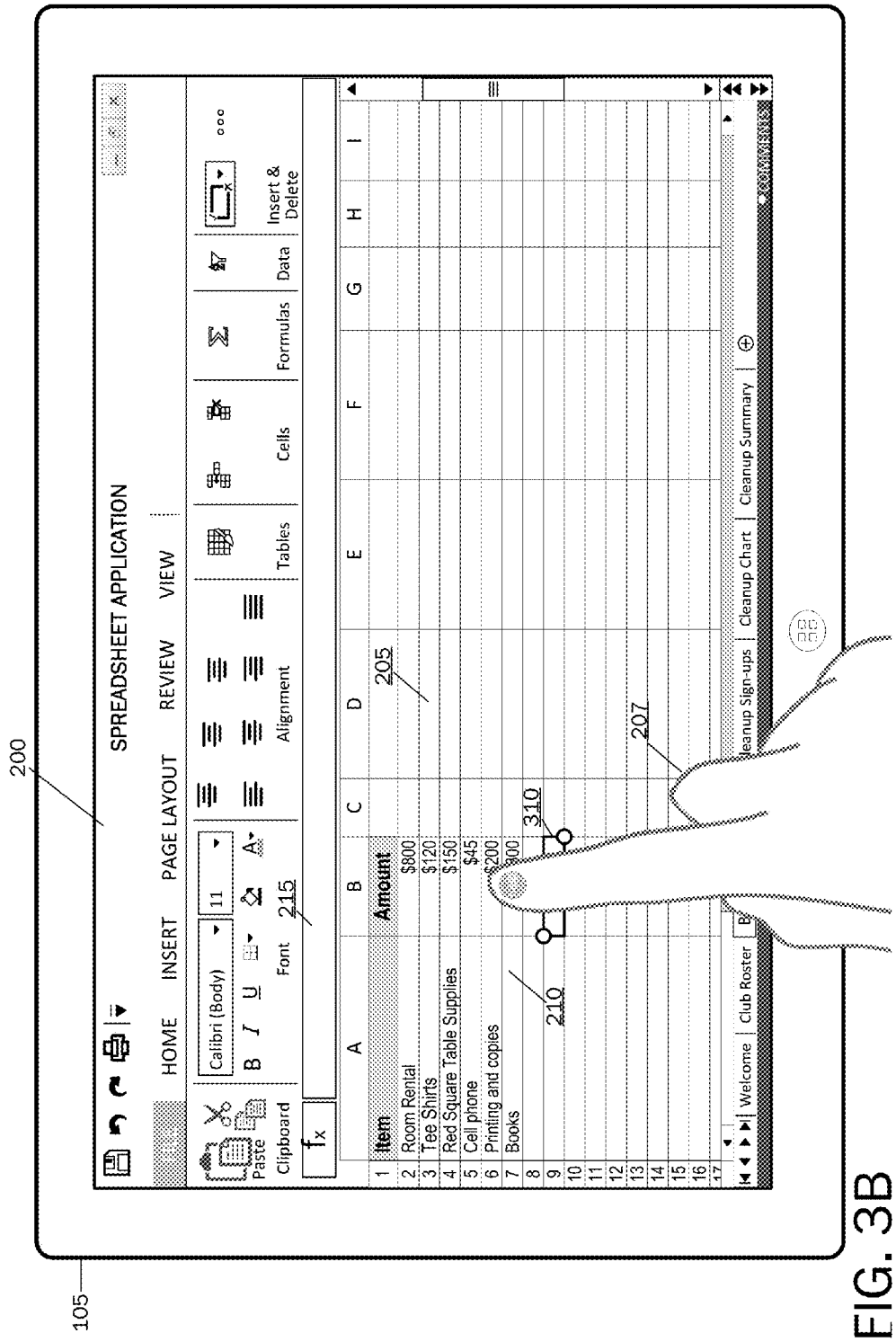
FIG. 3B illustrates the electronic spreadsheet document of FIG. 3A and showing touch interaction with a data item.

According to embodiments, in addition to entering an alphanumeric string into an open spreadsheet cell, as described above with reference to FIGS. 2A-2C, functions may also be automatically generated in the formula/function bar 215 by dragging or otherwise moving the contents of a given spreadsheet cell into a given spreadsheet location or spreadsheet application user interface component, such as a field designated for receiving spreadsheet content or syntax for generating an associated function. According to one example, functions may be automatically generated by dragging or otherwise moving or depositing cell contents or syntax in a given cell into the formula/function bar 215. As illustrated in FIG. 3A, a user 207 taps or otherwise interacts with an example spreadsheet cell B9 for either entering an alphanumeric string or for entering a function for application to one or more other data items contained in the spreadsheet 205. For example, a user may enter a function for adding data contained in the example cell B7 to data contained in the example cell B5 so that the resulting sum will be displayed in the example cell B9. Referring now to FIG. 3B, instead of entering a function such as "=B7+B9" for generating a function for adding the content of these two cells, according to embodiments, the user may interact with the desired cells for automatically generating the desired formula/function. As should be appreciated, a similar result may be achieved by moving cell contents or syntax into any other field or location in the sheet or spreadsheet application user interface designated for receiving such content or syntax for interpreting the content or syntax as a user desire for generating a function.

Figure 3C:
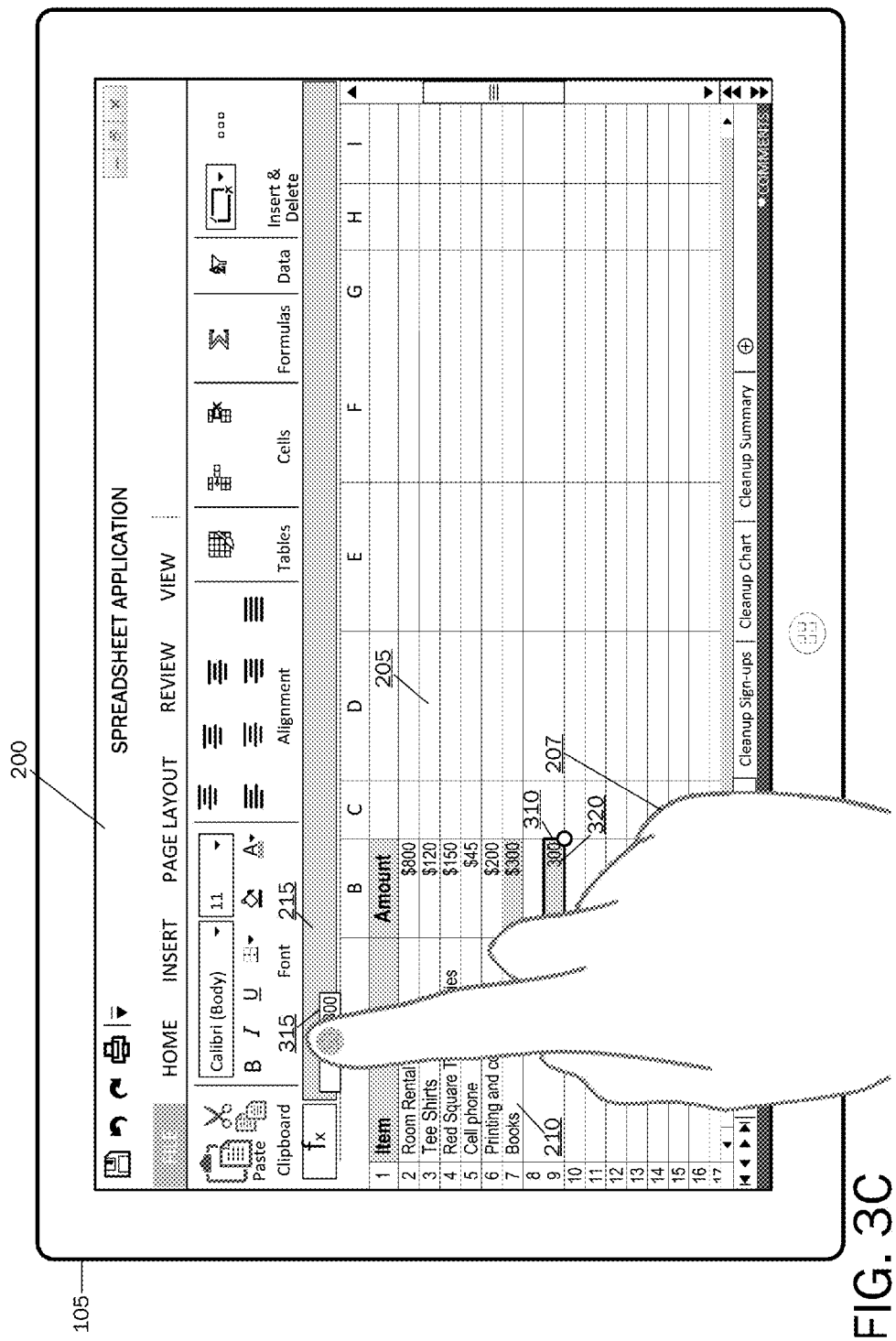
FIG. 3C illustrates the electronic spreadsheet document of FIG. 3B including a variety of data items and showing touch interaction with a data item.
Figure 3D:
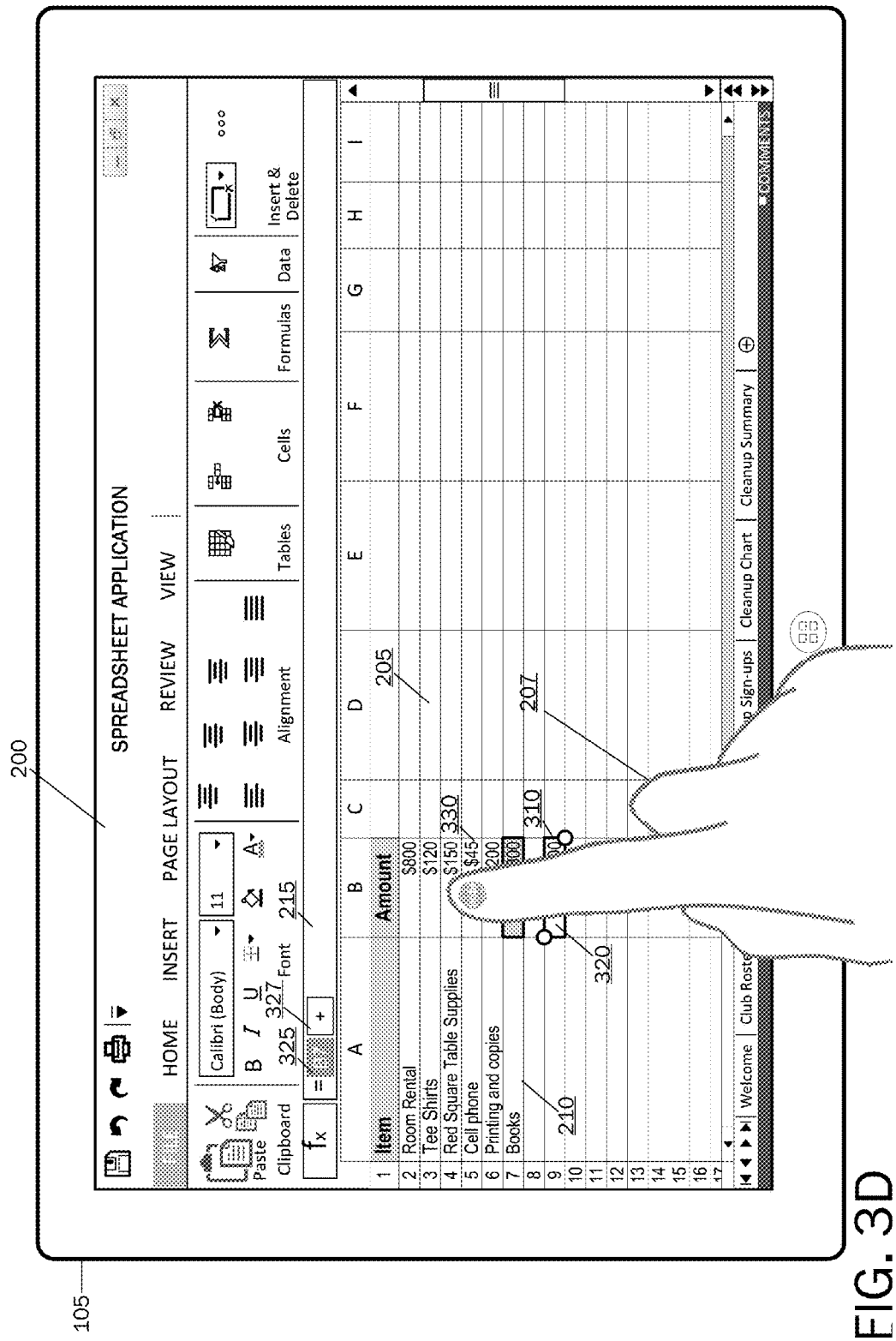
FIG. 3D illustrates the electronic spreadsheet document of FIG. 3C including a variety of data items and showing touch interaction with a data item.

As illustrated in FIG. 3B, the user taps and temporarily holds on the first cell B7, and as illustrated in FIG. 3C, the user drags or otherwise moves the contents of the interacted-with cell to the formula/function bar 215 such that the contents 315 are deposited into the formula/function bar 215. As should be appreciated, while a touch-enabled dragging of data is illustrated and described, other user interaction as described above may be utilized for moving the contents of the desired cell into the formula/function bar 215. Referring now to FIG. 3D, after the dragged or otherwise moved data is released into the formula/function bar 215, a cell reference corresponding to the data deposited into the formula/function bar is presented as part of an automatically generated mathematical function. That is, after the user releases the moved or dragged content into the formula/function bar 215, a cell reference 325 of "B7" is automatically entered into the formula/function bar 215 preceded by an "=" sign because the application 115 has interpreted the user's actions as an intention to build a function that will perform a mathematical operation on the data contained in the cell reference 325. Referring still to FIG. 3D, after the user releases the content of the desired cell into the formula/function bar 215, and after the system automatically enters the syntax of "=B7", the user may then return back to the spreadsheet 205 for interacting with a next data item that may be deposited into the formula/function bar 215 for completing the desired function.

According to embodiments, when the user interacts with a second data item, for example, the data item contained in example cell B5, a mathematical operator 327 may be automatically disposed in the formula/function bar 215 adjacent to the starting cell reference of "B7" based on an interpretation by the application 115 that the user intends to build a mathematical function to perform a mathematical operation on the data items being identified by the user interaction. According to embodiments, the mathematical operator 327 may be initially displayed in the formula/function bar 215 in a ghosted manner until it is determined that the initially offered mathematical operator is the desired mathematical operator. Alternatively, the mathematical operator 327 may not be disposed in the formula/function bar until a second or subsequent data item is deposited into the formula/function bar 215.

Figure 3E:
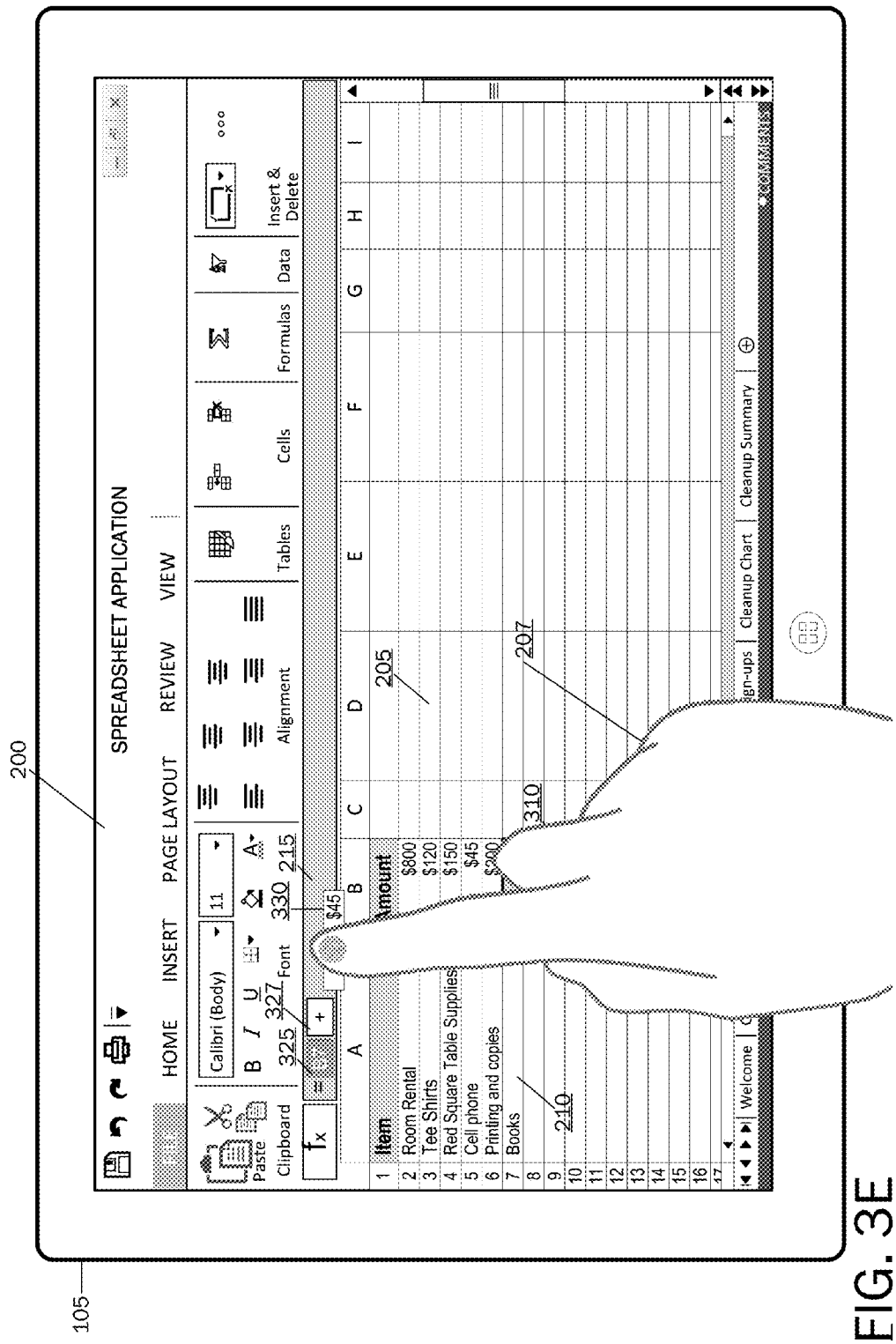
FIG. 3E illustrates the electronic spreadsheet document of FIG. 3D including a variety of data items and showing touch interaction with a data item.
Figure 3F:
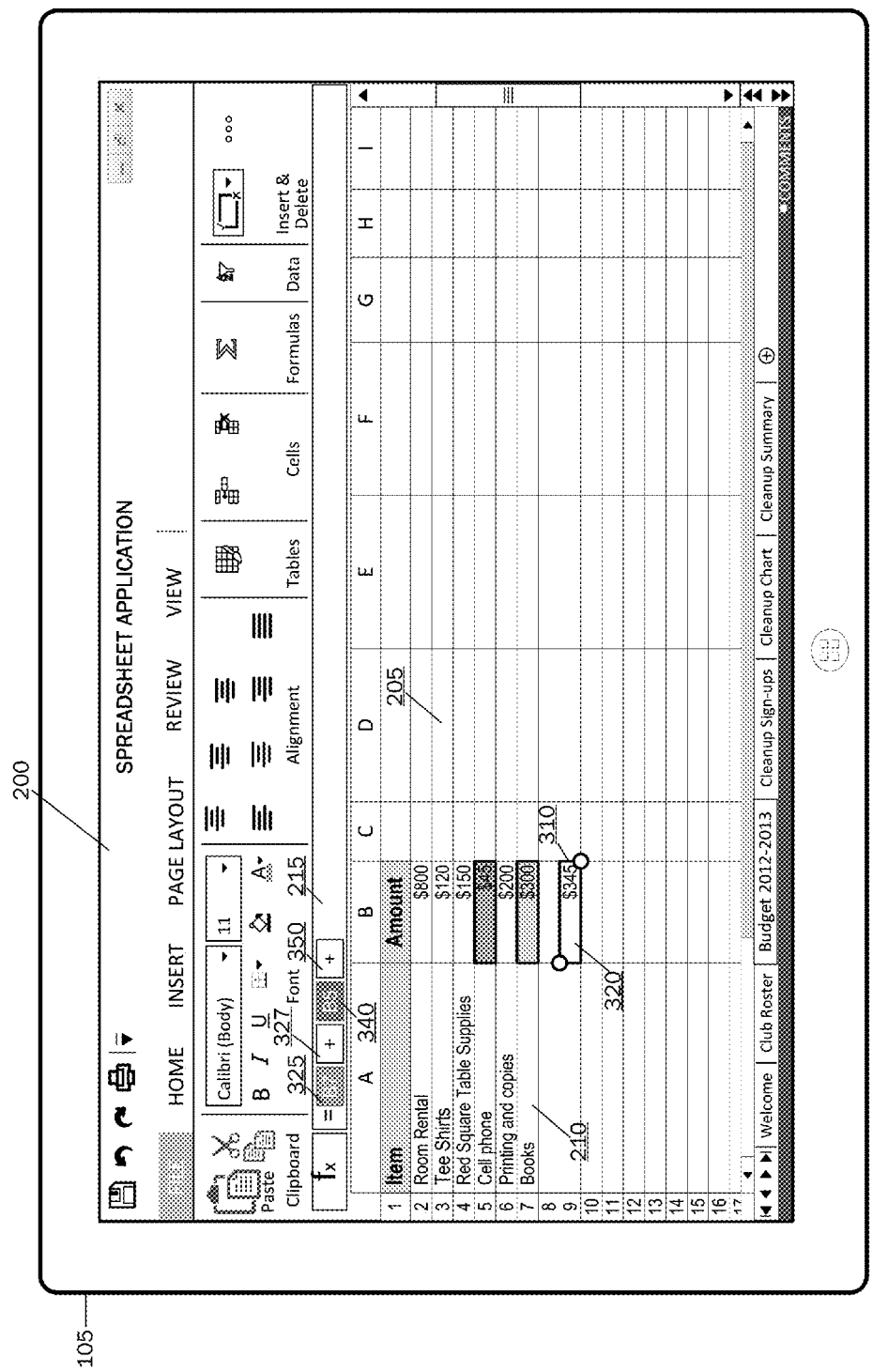
FIG. 3F illustrates an electronic spreadsheet document including a variety of data items and showing a plurality of cell references and formula/function operations in a formula/function bar.

Referring now to FIG. 3E, the user 207 drags the desired data item 330 toward the formula/function bar 215 for depositing the desired data item into the formula/function bar 215 adjacent to the previously generated syntax of "=B7+". As illustrated in FIG. 3F, when the user deposits the dragged or otherwise moved data item into the formula/function bar 215, a cell reference of B5 is automatically added to the previously generated syntax for generating a formula/function syntax of "=B7+B5" for adding the contents of cell B7 to the contents of cell B5 and for displaying the mathematical result 320 in the desired cell B9. As illustrated in FIG. 3F, after the cell reference B5 is added to the automatically generated function in the formula/function bar 215, a next mathematical operator 350 may be automatically presented for use in association with a subsequently identified data item contained in a subsequently interacted-with spreadsheet cell.

As a user adds additional data items, via interaction with one or more additional spreadsheet cells, the automatically generated function may be expanded and modified accordingly, and the mathematical result displayed in the example cell B9 may be automatically refreshed according to the data items and mathematical operations applied. As illustrated and described above, mathematical operations of "+" are automatically added between the disposed cell references. As should be appreciated, any other applicable mathematical operator, for example, mathematical operators for subtraction, multiplication, division, and the like may be automatically presented in the generated function. For example, according to one embodiment, a combination of parentheses may be automatically added and/or applied. For example, if a user enters or selects (e.g., from an operator menu) an opening parenthesis "(", a closing parenthesis ")" may be automatically inserted as needed. For example, if the user does a press and hold, and gets a menu or other spreadsheet application UI for choosing a mathematical operator followed by choosing an opening parenthesis "(", the corresponding closing parenthesis ")" may be generated and placed at the end of the formula or function. And, the user may reposition that character using their finger or other interaction described herein (e.g., a press and hold to lift the character for moving it around). Alternatively, a menu of mathematical operators may be provided for allowing a user to automatically select among a variety of different mathematical operators so that an appropriate and desired mathematical function may be generated.

Figure 3G:
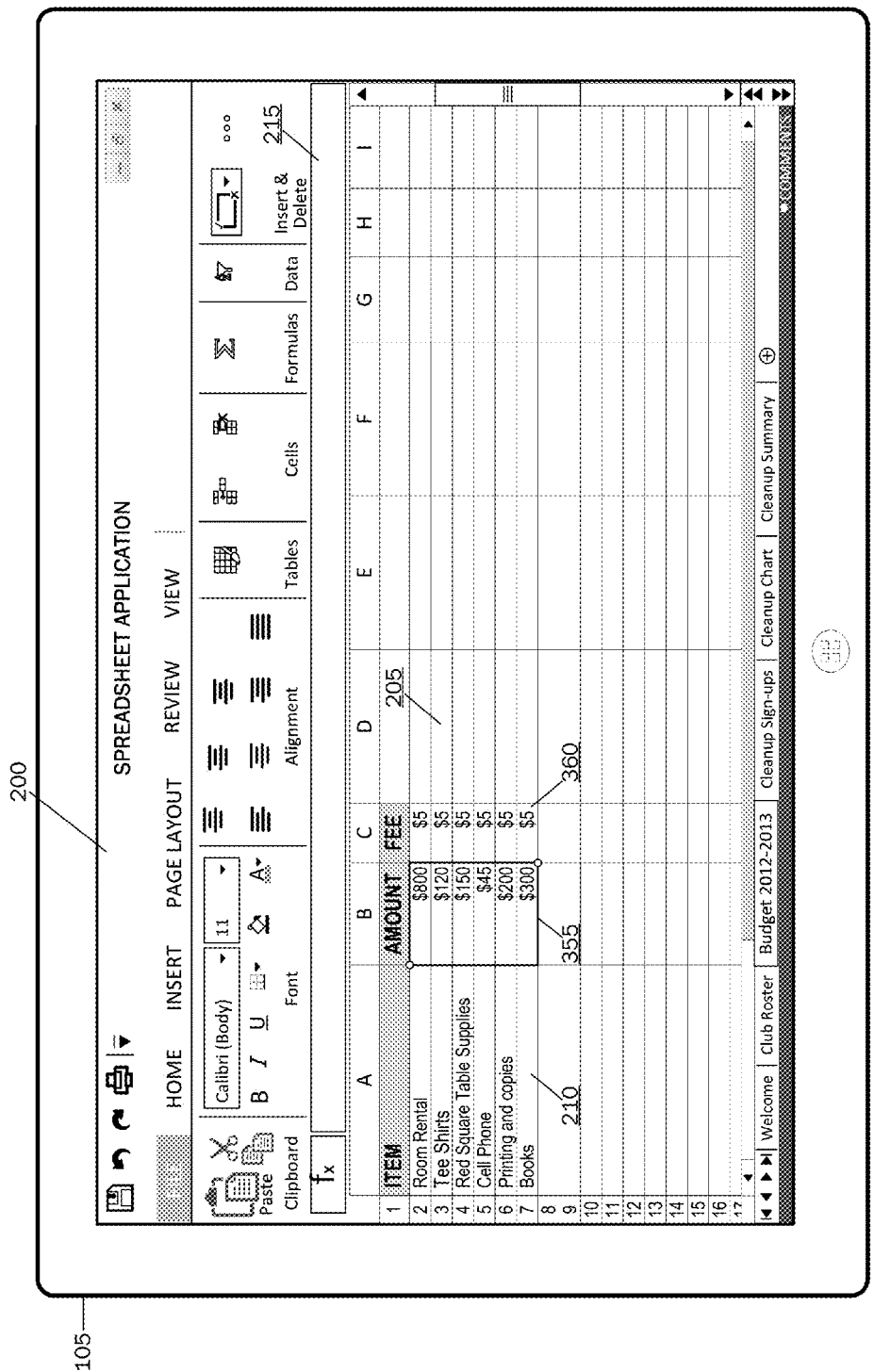
FIG. 3G illustrates an electronic spreadsheet document including a variety of data items.
Figure 3H:
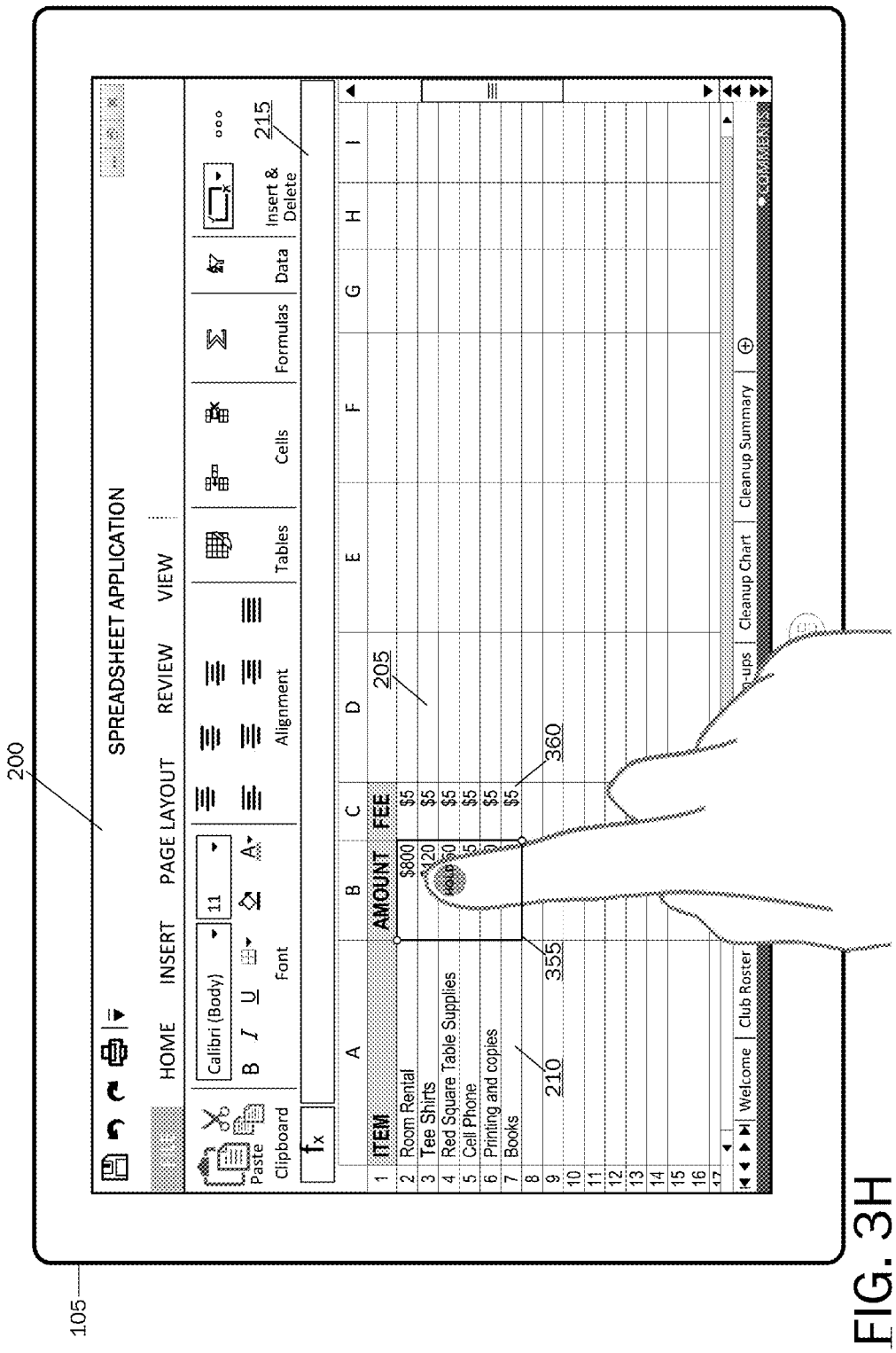
FIG. 3H illustrates the electronic spreadsheet document of FIG. 3G and showing touch interaction with a data item.
Figure 31:
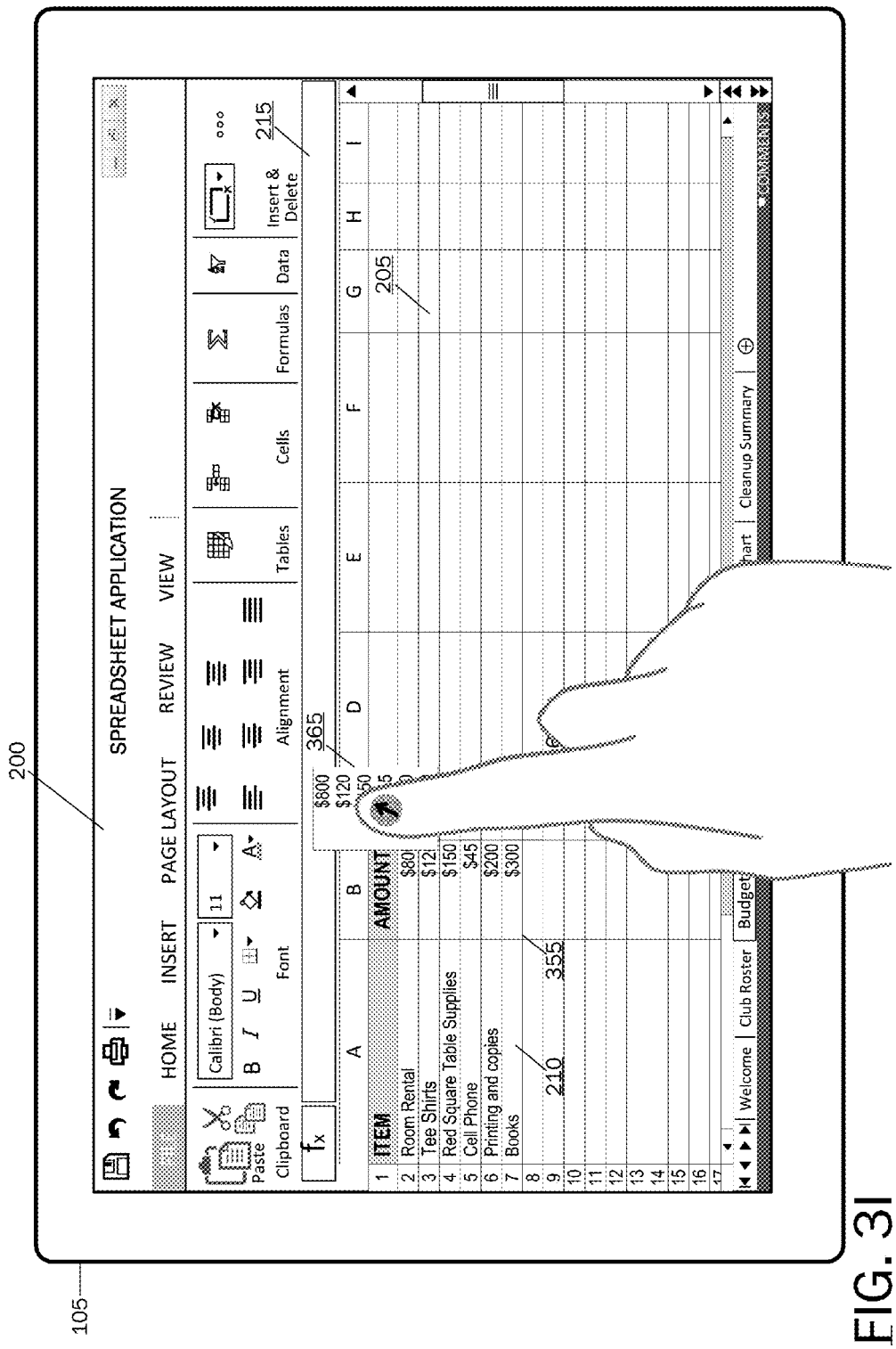

Referring now to FIG. 3G, two columns 355, 360 of data are displayed in the example spreadsheet document 205. As illustrated in FIG. 3H, according to embodiments, in addition to automatically generating a function by dragging or otherwise moving the data from a single spreadsheet cell into the function bar 215, multiple cells may be interacted with simultaneously such that a user may drag or otherwise move cell references for a plurality of cells from the spreadsheet grid into the formula/function bar 215 for automatically generating a function application to the desired range. As illustrated in FIG. 3H, the user 207 selects a range of data comprised of data items contained in the example cells B2-B7. As illustrated in FIG. 3I, the user may move the selected range of cells toward the formula/function bar 215 for depositing the selected range 365 into the formula/function bar 215. According to one embodiment, as the user moves the selected range from the spreadsheet document 205 toward the formula/function bar 215, a graphical display of the being-moved data, for example, a ghosted display of the being-moved data may be presented for graphically illustrating a movement of the data from the spreadsheet into the formula/function bar.

Figure 3J:
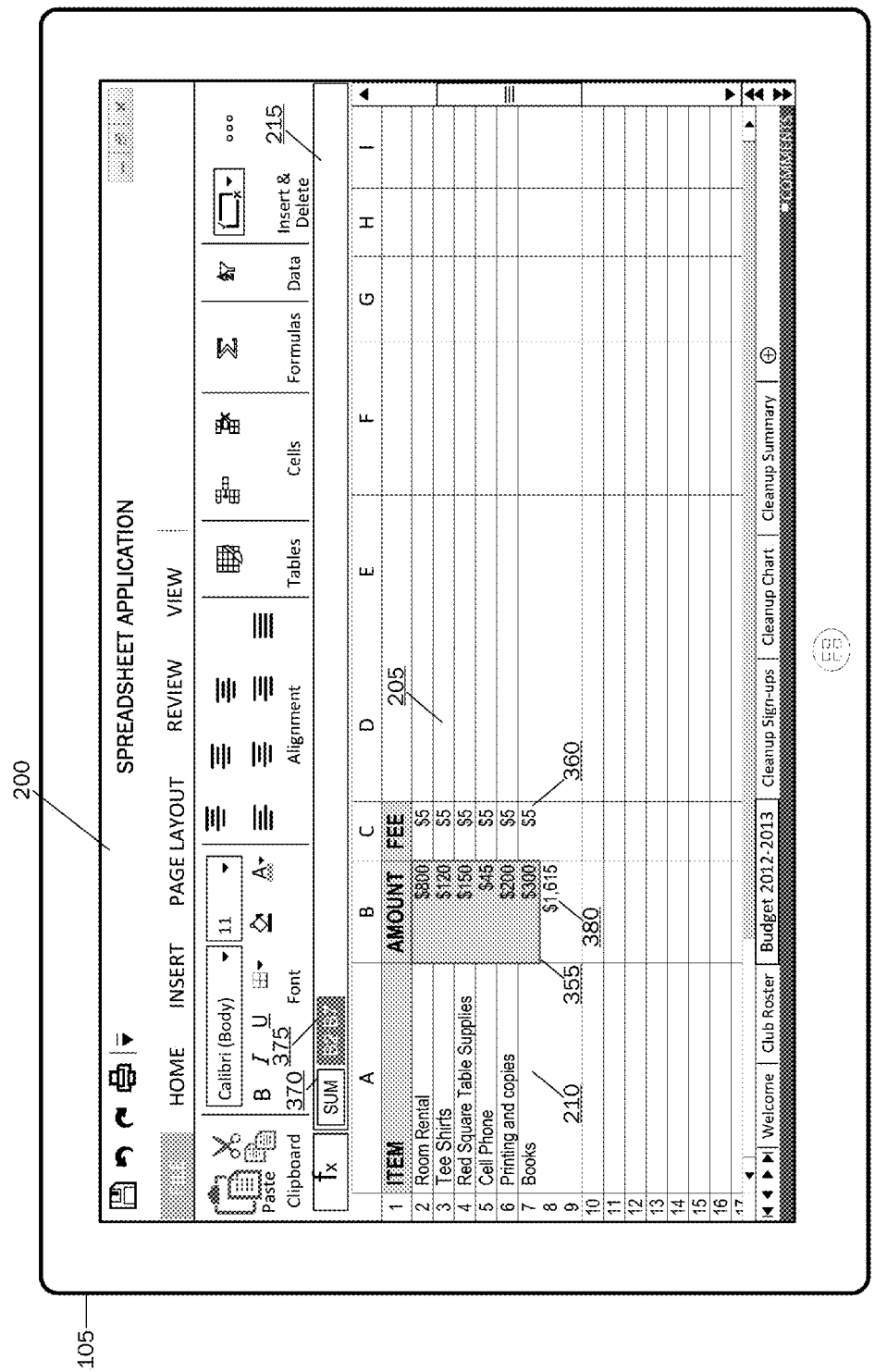
FIG. 3J illustrates the electronic spreadsheet document of FIG. 3I including a variety of data items and showing a plurality of cell references and formula/function operations in a formula/function bar.

After the dragged or otherwise moved (e.g., flicked) data is released into the formula/function bar 215, cell references 375 corresponding to the data deposited into the formula/function bar are presented as part of an automatically generated mathematical function. Referring still to FIG. 3J, after the cell references associated with the dragged or moved data items are determined and disposed in the formula/function bar 215, the application 115 may determine that the user intends to generate a mathematical function, and therefore, a mathematical operator 370 that may be used for a range of data may be automatically added to the cell references to generate the proper syntax of a mathematical function that may be used for operating on the data contained in the displayed cell references. For example, as illustrated in FIG. 3J, the mathematical operator of "sum" is automatically placed in front of the displayed cell references, because one mathematical operation that may be applied to a range of data such as the range of data illustrated in column B of FIG. 3J is the operation of summing the data items contained in the range.

As should be appreciated, the mathematical operator 370 may be automatically determined for the range of data associated with the cell references and may be presented as illustrated in FIG. 3J, or alternatively, the mathematical operator 370 may be presented in a ghosted or otherwise temporary manner until the user accepts the offered mathematical operator by selecting on the operator according to any available selection means, for example, tapping, mouse clicking, voice activation, gesturing, and the like. In addition, as described above, the initially offered mathematical operator, for example, "sum", may be offered as a menu of mathematical operator choices, for example, sum, min, max, average, median, mode, and the like or any other mathematical operator (e.g., (+, –, *, /, ^, <, >, ( ), etc.) that may be utilized for a plurality of data items.

As illustrated and described above with reference to FIGS. 3E and 3F, additional data items may be dragged or otherwise moved from the spreadsheet document 205 into the formula/function bar 215 for adding to or otherwise modifying the automatically generated function displayed in the formula/function bar 215. For example, one or more additional data items, or one or more additional ranges of data items may be dragged to or otherwise moved to the formula/function bar 215 for adding to or modifying the function presently displayed in the formula/function bar 215. For example, an additional range of data items may be dragged to the formula/function bar 215, and the cell references associated with those data items may be added to the function contained in the formula/function bar 215 for summing the additional data items, for adding the additional data items to the previously summed data items, for subtracting the data items from the previously summed data items, and the like.

Figure 4A:
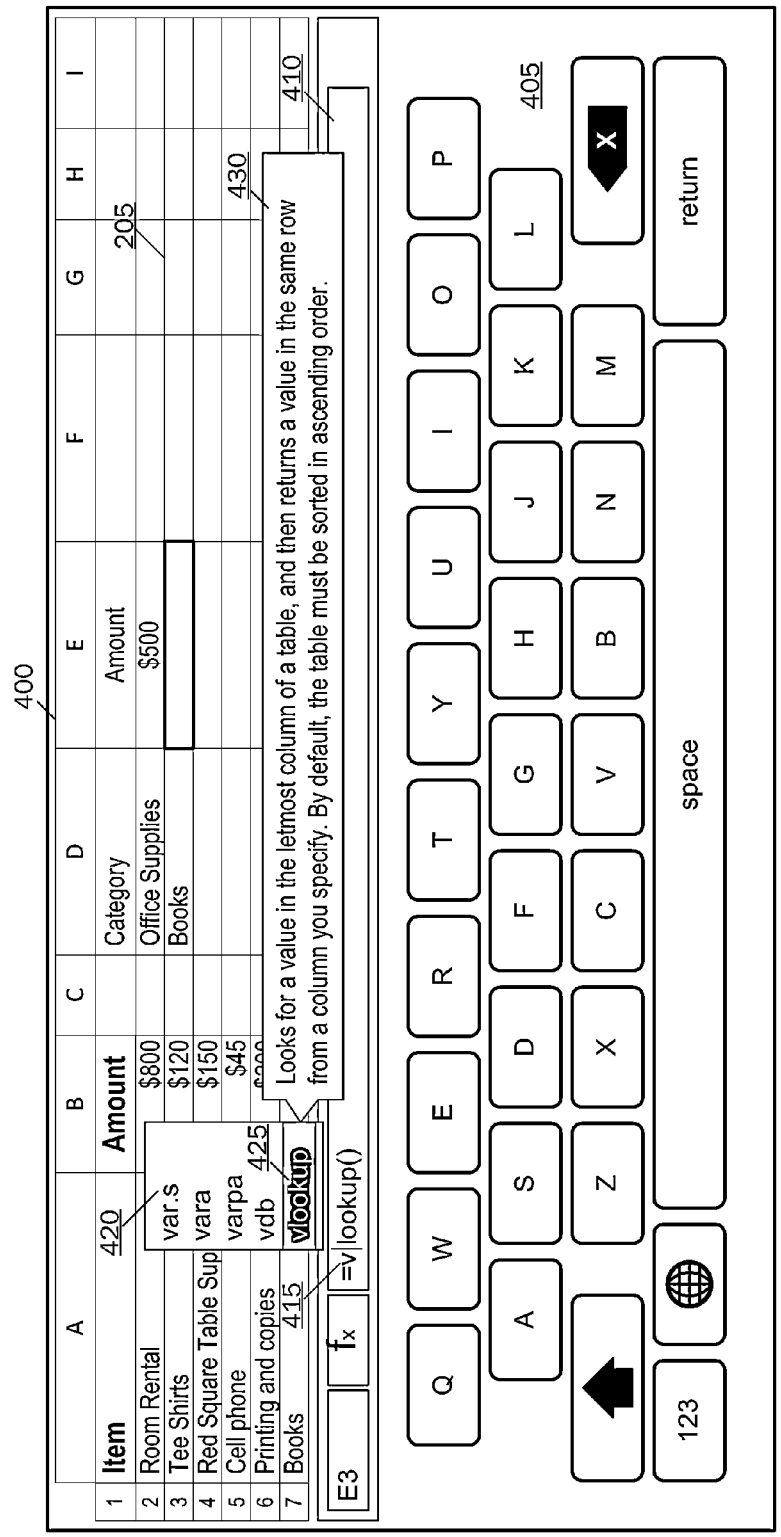
FIG. 4A illustrates an electronic spreadsheet document including a variety of data items and showing a displayed soft keyboard and a plurality of selectable spreadsheet functions.

According to embodiments, a user may be assisted in generating spreadsheet functions by automatically suggesting completion of one or more functions being entered into a spreadsheet formula/function bar as the user begins to enter the characters comprising a desired formula/function. Referring to FIG. 4A, an example spreadsheet document 205 is illustrated containing one or more data items for which a user may desire a spreadsheet function for operation on one or more data items contained in the spreadsheet document. According to embodiments, as the user begins typing or otherwise entering a spreadsheet function 415 in the formula/function bar 410, an automatically suggested completion of the function being entered by the user may be presented in the formula/function bar 410 as a "ghosted" or otherwise temporary completion of the being-entered function.

According to one embodiment, a pop-up dialog or menu 420 may be provided in which may be listed a plurality of formulas or functions that may be suggested as completions of the formula/function being entered by the user. For example, referring still to FIG. 4A, as the user types the "=v" 415 into the formula/function bar 410, an automatically suggested completion of "lookup( )" may be presented in ghosted or otherwise temporary form for automatically suggesting a completion of the function "vlookup" to the user.

As illustrated and described below with reference to FIG. 4B, if the user selects the automatically suggested completion of the being-entered formula/function, then entry of the function may be completed, and the entered function may be automatically applied to one or more data items contained in the spreadsheet document 205. Alternatively, if the automatically suggested completion of the being-entered formula/function is not the desired formula/function, the user may select one of the other suggested formulas or functions provided in the example menu 420. As should be appreciated, as the user types or otherwise enters additional characters, then the automatically suggested completion of the formula/function may be modified as possible candidates for the being-entered formula/function are narrowed. For example, referring still to FIG. 4A, if the user types or enters the characters "va", then the automatically suggested completion of the being-entered formula/function will be a formula/function beginning with the characters "va".

Referring still to FIG. 4A, a balloon 430 is illustrated in association with an automatically suggested formula/function that may provide helpful or explanatory information about the formula/function being automatically suggested to the user. As the list of automatically suggested completions of the being-entered formula/function is filtered as the user enters additional characters, the balloon 430 may be automatically updated and/or modified for providing helpful or explanatory information about other automatically suggested formulas or functions.

Figure 4B:
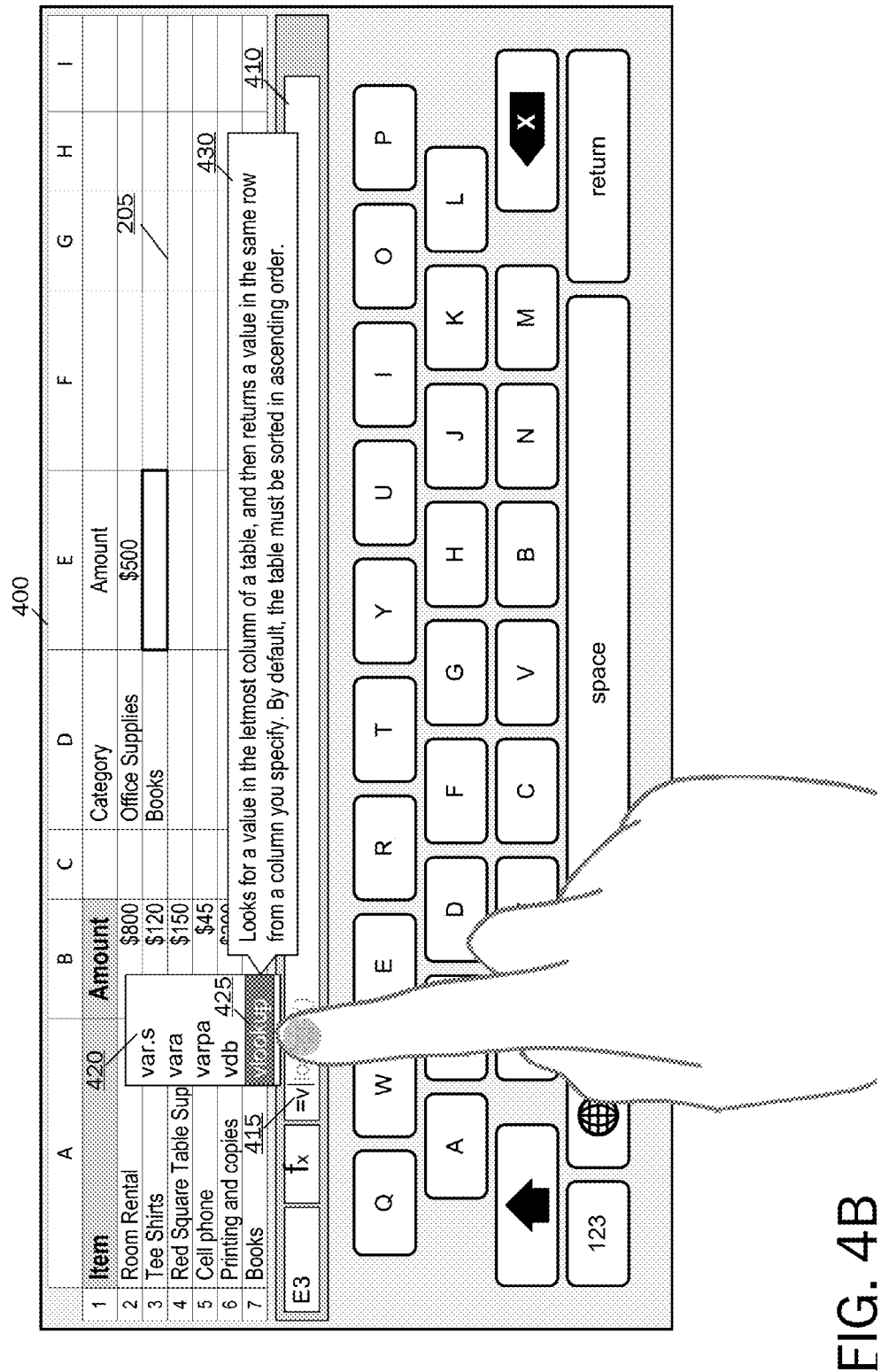
FIG. 4B illustrates the electronic spreadsheet document of FIG. 4A including a variety of data items and showing user entry of a spreadsheet function in a formula/function bar.
Figure 4C:
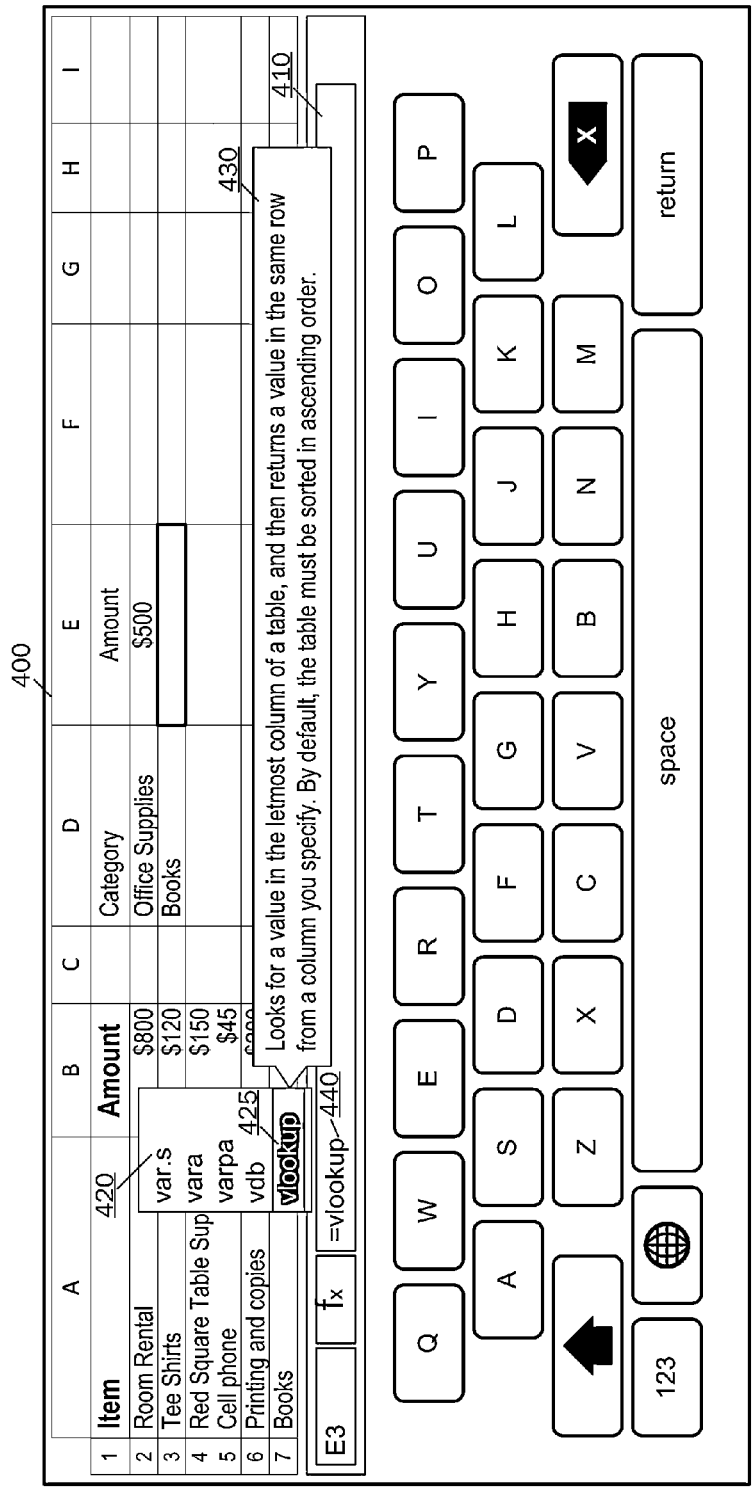
FIG. 4C illustrates the electronic spreadsheet document of FIG. 4B including a variety of data items and showing user entry of a spreadsheet function in a formula/function bar.

The user may accept an automatically suggested formula/function by selecting the ghosted or otherwise temporarily displayed automatically suggested completion, such as illustrated in FIG. 4B as a user tapping on the ghosted automatically suggested completion of the function "vlookup". Alternatively, the user may select one of the other automatically suggested formulas or functions listed in the menu 420, and the selected formula/function will be automatically populated in the formula/function bar 410 and may be automatically applied to one or more data items contained in the spreadsheet 205. As illustrated in FIG. 4C, after a given automatically suggested formula/function 440 is accepted by the user, the accepted formula/function is displayed in the formula/function bar 410 and is applied to one or more data items contained in the spreadsheet 205. If the user does not accept an automatically suggested completion of a being-entered formula/function, the user may reject the suggested formula/function by deleting a completed formula/function, or by selecting a different automatically suggested formula/function, or by continuing to enter characters of a desired formula/function for receiving additional suggested completions, or until the user has completely entered a formula/function, as desired.

Referring now to FIGS. 5A and 5B, according to an embodiment, an "always visible" formula/function bar (also referred to as a formula or function guide) may be provided that helps a user understand the different arguments/components of a given formula/function the user has generated or that has been automatically suggested to the user for application to one or more data items contained in a spreadsheet application document. As illustrated in FIG. 5A, a spreadsheet application user interface 500 is illustrated in which is displayed a spreadsheet document 510 containing a number of data items 512, 514 and containing a formula/function bar 515 disposed along a lower edge of the example user interface 500. As illustrated in the formula/function bar 515, a mathematical function has been entered or accepted after an automatic function suggestion for application to one or more data items 512, 514 contained in the spreadsheet document 510. According to one embodiment, the formula or function bar 515 may serve as a formula/function guide, and a display of the bar 515 may be persisted to allow a user to have constant viewing access to the components of a given spreadsheet function or formula. As should be appreciated, if a user does not wish to have the display of the bar persisted, the bar 515 may be dismissed from view/display.

As understood by those skilled in the art, a given formula/function generated for application to one or more data items in a spreadsheet document may contain a number of components and/or arguments and/or a variety of different mathematical operators, as well as, designated data items, data cells, data ranges, data tables, and the like against which the formula/function is to be applied. As illustrated in the formula/function bar 515 (FIG. 5A), a "vlookup" function 520 has been entered, and a variety of function components 525, 530, 535, 540 are applied to the function 520 for application of the function against one or more data items.

According to embodiments, as a user focuses on the function type, or any argument or component comprising the function, a pop-up balloon or other similar user interface component 545 may be provided for displaying helpful or explanatory information about the focused-on function type, component or argument. For example, as illustrated in FIG. 5A, if a user focuses on the component 525 of "lookup_value", by tapping on the component, clicking on the component, mouse hovering over the component, voice focusing on the component, gesture focusing on the component, or the like, the balloon or pop-up user interface component 545 may be automatically displayed for providing information to the user about the focused-on function component. As illustrated in FIG. 5B, another example balloon or pop-up user interface component 560 is illustrated containing helpful and/or explanatory information about a different function argument or component focused on by the user. As should be appreciated, the example function and function components illustrated in FIGS. 5A and 5B are for purposes of example only and are not exhaustive of the vast numbers of spreadsheet functions and/or formulas that may be entered into the formula/function bar 515 comprised of a variety of different arguments and/or components for which helpful and/or explanatory information may be provided.

Figure 6:
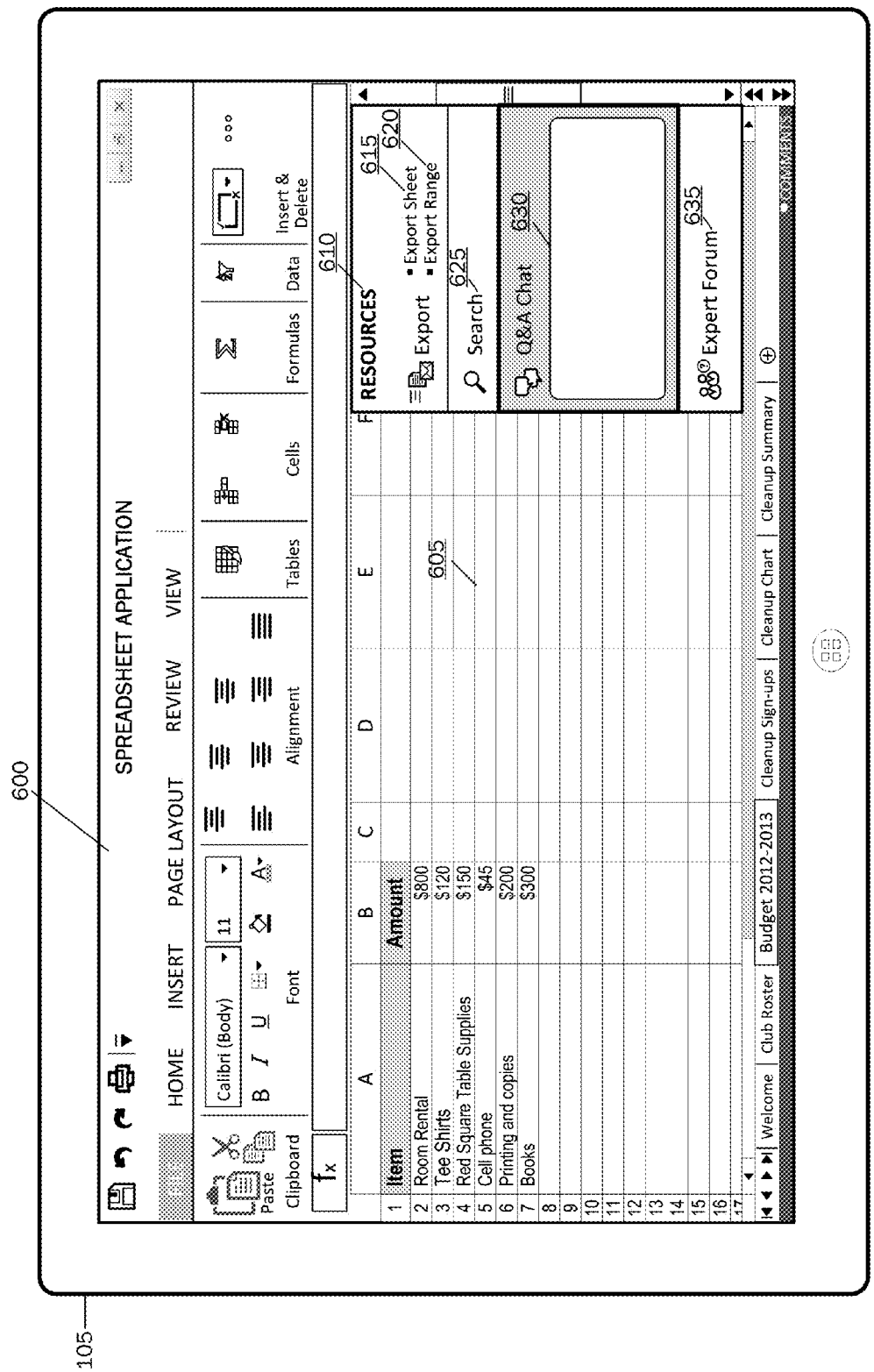
FIG. 6 illustrates an electronic spreadsheet document including a variety of data items and showing a displayed help resources pane.
Figure 7:
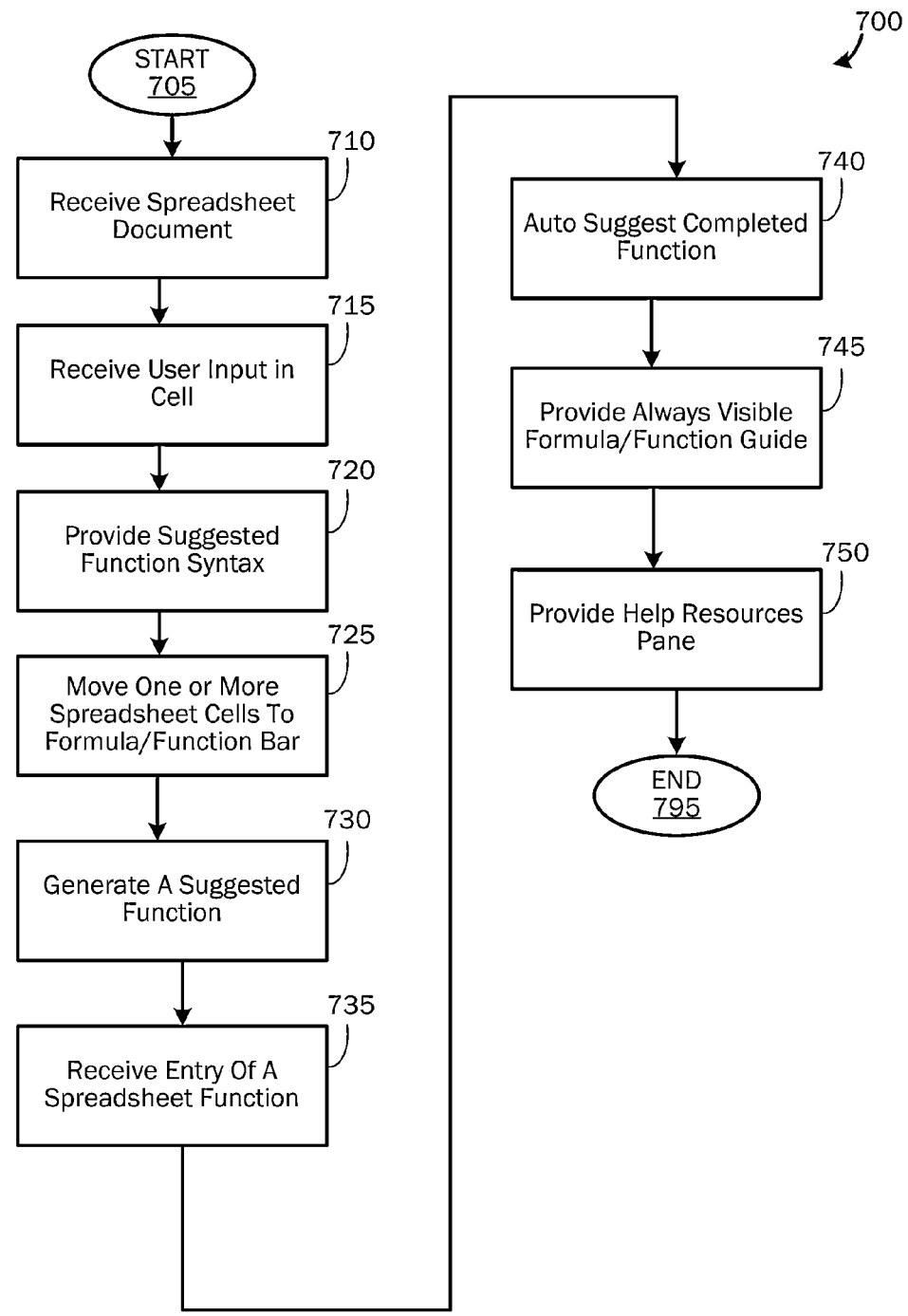
FIG. 7 is a flowchart illustrating a method for formula and function generation and use in electronic spreadsheets.

Referring now to FIG. 6, according to another embodiment, additional resources to help a user create, edit, understand, and utilize spreadsheet functions and formulas may be automatically suggested and/or surfaced to the user via a help resources pane 610 or other suitable user interface component. According to embodiments, the help resources pane 610 may be used for providing a variety of helpful information about spreadsheet applications in general, including information about how to use various functionalities of the associated spreadsheet application, or the help resources pane 610 may be utilized for providing helpful information to a user about specific data items, formulas/functions, or other aspects of a given spreadsheet document.

As illustrated in FIG. 6, a help resources pane or user interface component 610 is illustrated as a floating user interface component over a displayed spreadsheet application document 605. According to embodiments, the help recourses pane 610 may be displayed as a floating user interface component, as illustrated in FIG. 6, or may be displayed in a static portion of the spreadsheet application user interface 600 set aside for providing the help resources 610.

According to these embodiments, as the spreadsheet application document is scrolled up/down or right/left, the floating or static resources help resources pane 610 may remain positioned in a given location regardless of the scrolling applied to the spreadsheet application document 605. According to an alternative embodiment, the help resources pane 610 may be associated with a given portion of or position in the spreadsheet application document 605 such that the help resources pane 610 remains in a location in close proximity to a given portion or location in the document. For example, if the help resources pane 610 is launched for receiving resources or other helpful information in association with a given table, chart, or other object contained in the spreadsheet document 605, the help resources pane 610 may be positioned in association with the spreadsheet object to which it is associated such that the help resources pane stays with the associated object as the spreadsheet document is scrolled.

Referring to the help resources pane 610, an "Export Sheet" button 615 is provided for allowing a user to export a spreadsheet to a third party source for obtaining helpful information from the third party source about various aspects of the exported sheet. An "Export "Range" button 620 is illustrated for exporting a given data range of a given spreadsheet to a third party source for obtaining helpful information about aspects of the exported range. For example, if a user has a spreadsheet 605 containing various data items or a range of data contained in a spreadsheet 605 for which the user has questions, for example, how to generate a given formula/function for operating on one or more data items, the user may export the spreadsheet 605, or a range contained in the spreadsheet 605 to a third party source for obtaining helpful information.

A "Question and Answer" chat box 630 is illustrated in the pane 610 with which a user may enter questions for one or more third party information sources and in which the user may receive helpful answers to her questions. A "Search" button 625 is illustrated for launching one or more search functions either operated by the spreadsheet application for obtaining helpful information, or for launching an Internet-based search for obtaining information with respect to the spreadsheet application or with respect to a given spreadsheet document or one or more data items contained therein. For example, use of the search function may allow a user to launch an instance of an Internet browser application in the help resources pane 610 for searching for various information items associated with the user's spreadsheet application or in association with aspects of a particular spreadsheet document 605.

An "Expert Forum" button 635 is illustrative of a resources function for allowing a user to join, collaborate with, receive information from, or provide information to any of a number of different forums established by various parties interested in collaborating on or providing or receiving information about the application 115 in use or about the document 605 being generated and utilized by the user. A variety of different kinds of information may be obtained by the user through the resources pane 610 including online videos, templates, examples, social networking forums, crowd sourcing services, etc. As should be appreciated, the layout and user interface components illustrated in the help resources pane 610 are for purposes of example and illustration only and are not limiting of the vast numbers of user interface components, layouts, and information items that may be provided in the help resources pane 610 in association with a spreadsheet application and/or a given spreadsheet application document 605.

Having described an example operating environment and various aspects of embodiments of the present invention above with reference to FIGS. 1 through 6, FIG. 7 is flowchart illustrating a method for formula and function generation and use in electronic spreadsheets. The routine 700 begins at operation 705 and proceeds to operation 710 where a spreadsheet application document is launched for allowing a user to enter, edit, manipulate, operate on, or otherwise utilize one or more data items. At operation 715, a user input is received in a given spreadsheet cell, as illustrated and described above with reference to FIG. 2B. At operation 720, a suggested spreadsheet function syntax is provided in a formula/function bar 215 in response to the user's input at operation 715.

At operation 725, one or more spreadsheet cells are dragged to or otherwise moved from the spreadsheet application grid or canvas to the formula/function bar, as illustrated and described above with reference to FIGS. 3B through 3J. At operation 730, a suggested function may be generated and displayed in the formula/function bar for use in association with the one or more spreadsheet cells moved to the formula/function bar.

At operation 735, entry of one or more characters of a spreadsheet formula/function is received in a spreadsheet application formula/function bar, as illustrated and described above with reference to FIGS. 4A-4C. At operation 740, an automatically suggested completion of the being-entered formula/function is provided in the formula/function bar. As described above, the user may accept the automatically suggested formula/function, if desired, and the accepted formula/function may then be applied to one or more selected data items.

At operation 745, an always visible formula/function guide may be provided, as illustrated and described above with reference to FIGS. 5A and 5B, and helpful and/or explanatory information may be provided in a balloon or other pop-up user interface component for providing information about arguments and/or components of a given formula/function. At operation 750, a variety of helpful resources and information may be provided in a help resources pane 610, as illustrated and described above with reference to FIG. 6.

The routine 700 ends at operation 795.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
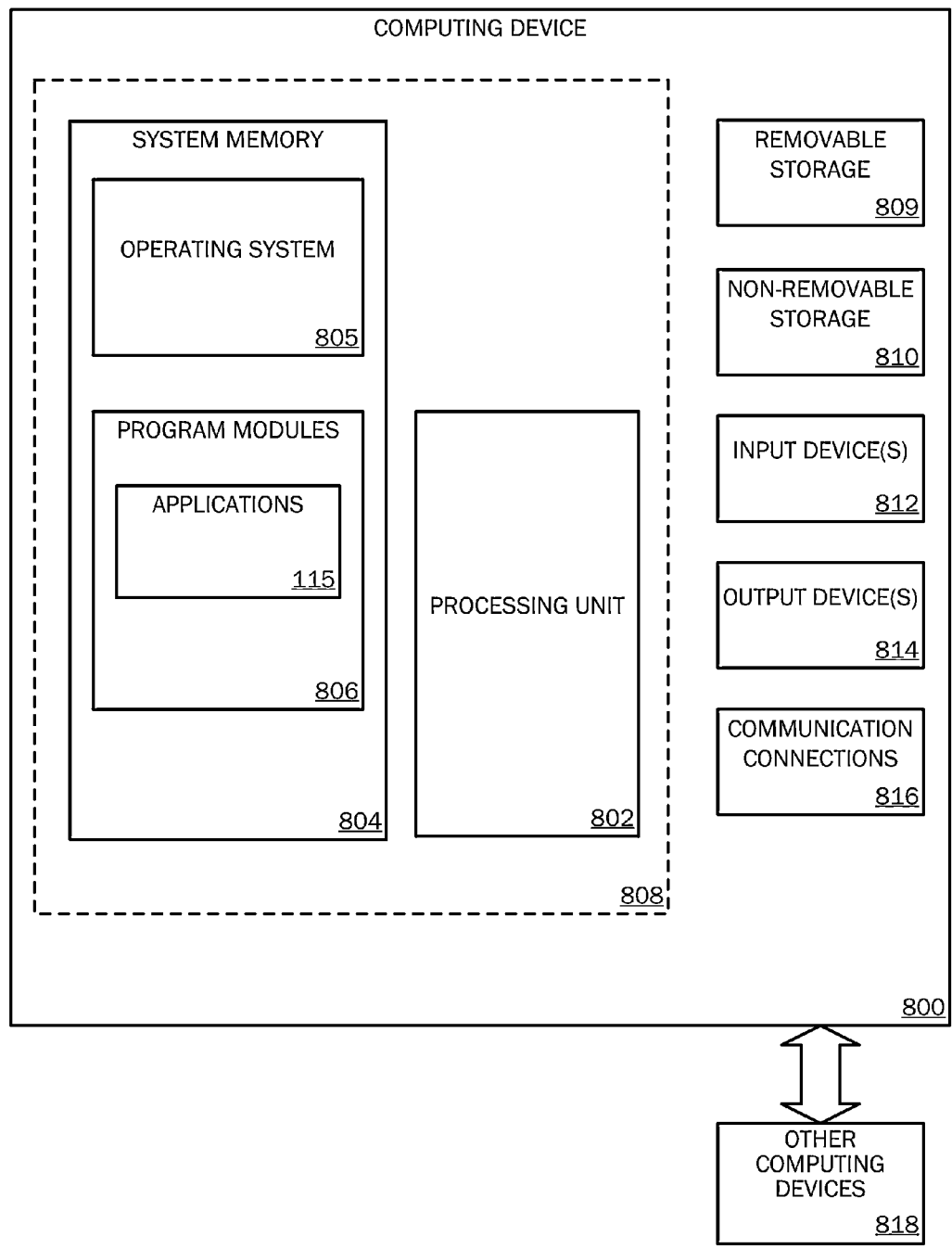
FIG. 8 is a simplified block diagram illustrating example physical components of a computing device with which embodiments of the invention may be practiced.
Figure 9A:
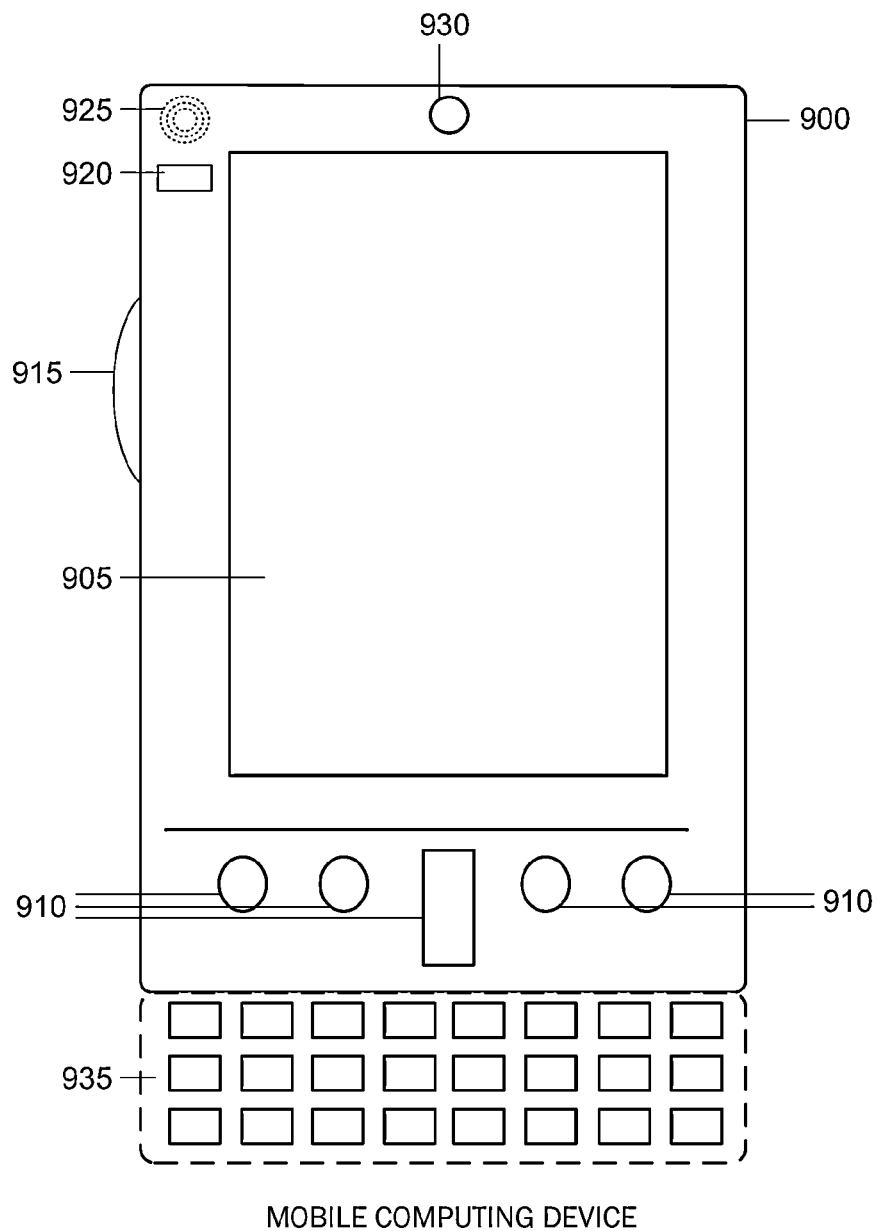
FIGS. 9A and 9B are simplified block diagrams of a mobile computing device with which embodiments of the present invention may be practiced.
Figure 9B:
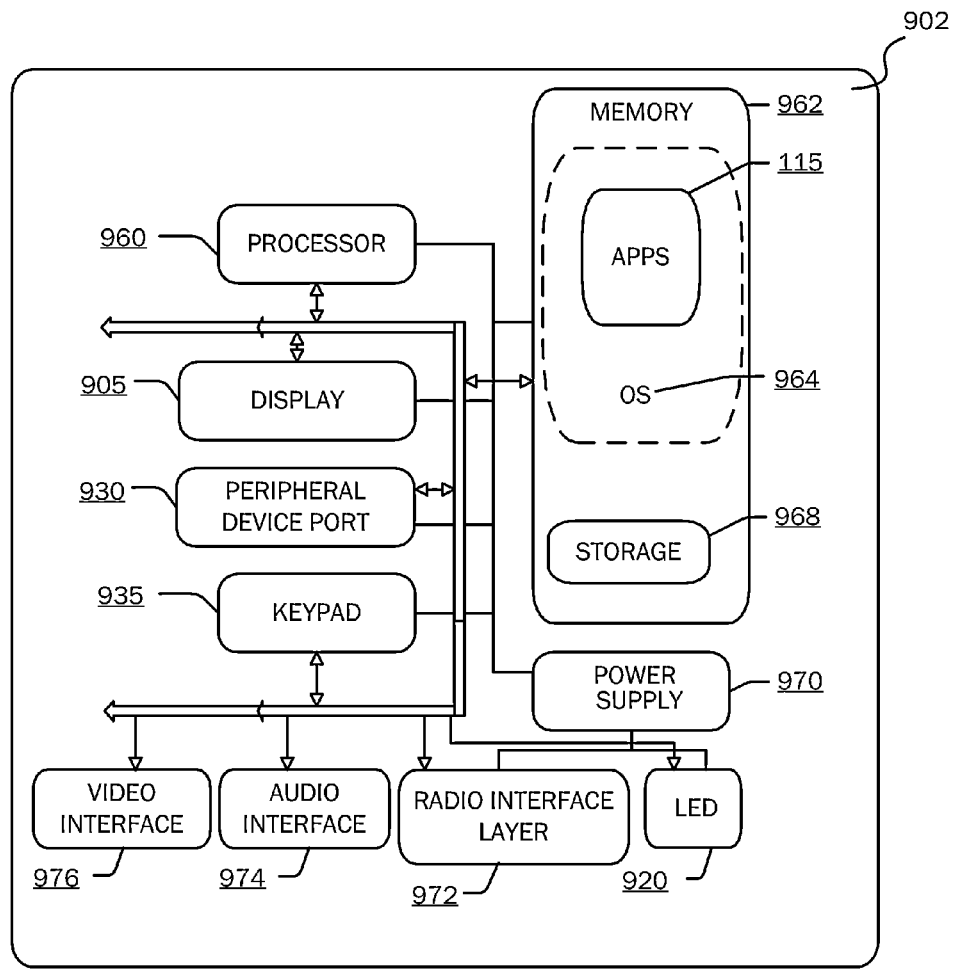
Figure 10:
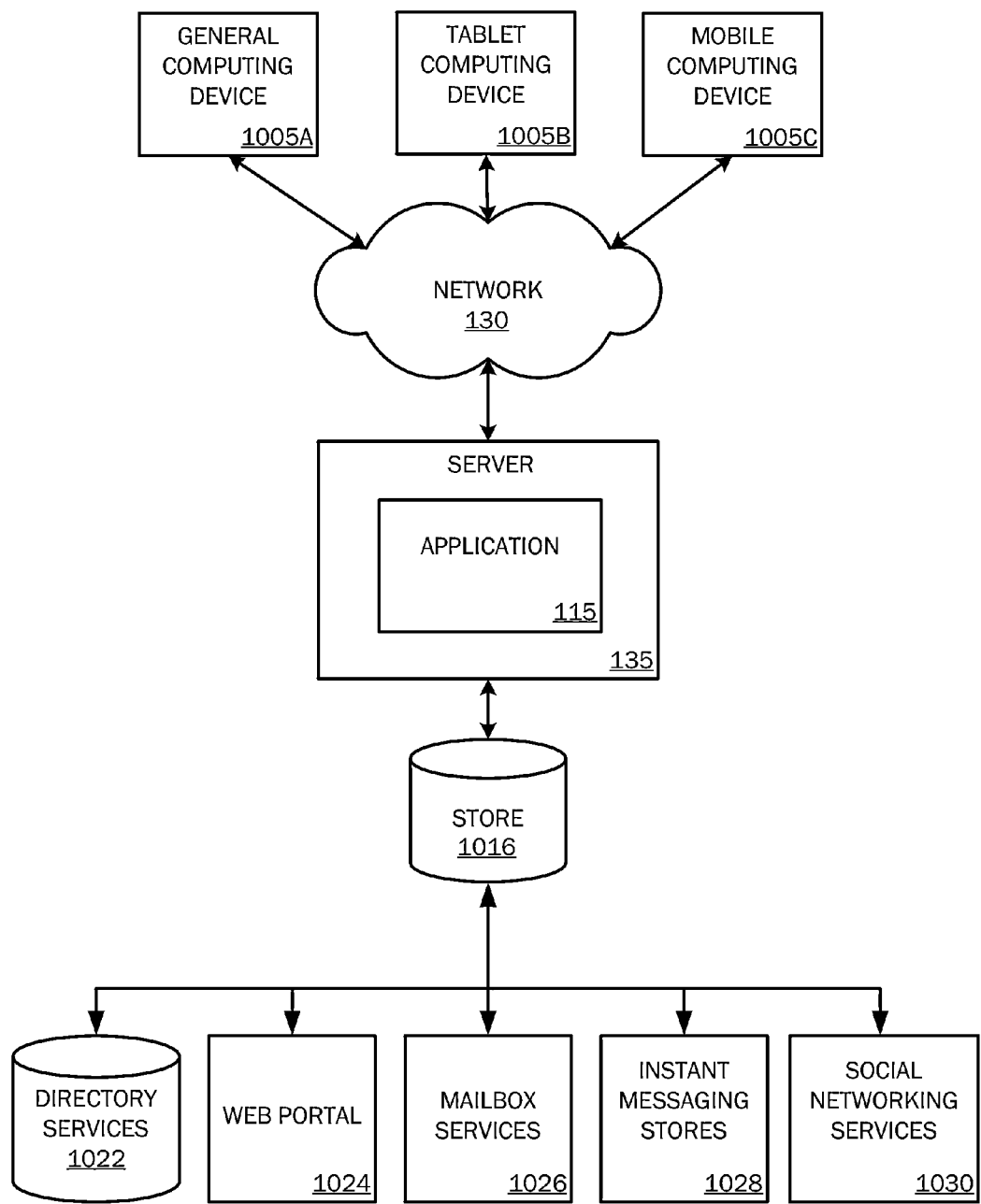
FIG. 10 is a simplified block diagram of a distributed computing system in which embodiments of the present invention may be practiced.

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 800 with which embodiments of the invention may be practiced. The computing device components described below may be suitable for the computing devices 105, 110, 120, 125, 135 described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running a variety of applications 820. The operating system 805, for example, may be suitable for controlling the operation of the computing device 800. Furthermore, embodiments of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 may perform processes including, but not limited to, one or more of the stages of the method 700 illustrated in FIG. 7. Other program modules that may be used in accordance with embodiments of the present invention may include applications, such as, notes applications, Internet browser applications, electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to use of web page content may be operated via application-specific logic integrated with other components of the computing device 800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800.

FIGS. 9A and 9B illustrate a mobile computing device 900, for example, a mobile telephone, a smart phone 110, a tablet-style personal computer 105, a laptop computer, and the like, with which embodiments of the invention may be practiced. With reference to FIG. 9A, one embodiment of a mobile computing device 900 for implementing the embodiments is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 900 incorporates a vibration transducer for providing the user with tactile feedback. In yet another embodiment, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 900 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs may be loaded into the memory 962 and run on or in association with the operating system 964. Examples of the application programs include phone dialer applications, e-mail applications, personal information management (PIM) applications, word processing applications, spreadsheet applications, Internet browser applications, notes applications, messaging applications, and so forth. The system 902 also includes a non-volatile storage area 968 within the memory 962. The non-volatile storage area 968 may be used to store persistent information that should not be lost if the system 902 is powered down. The application programs may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 115 via the operating system 964, and vice versa.

The visual indicator 920 may be used to provide visual notifications and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one embodiment of the architecture of a system for providing efficient spreadsheet function creation and use with electronic computing devices, as described above. Content developed, interacted with, or edited in association with embodiments of the invention may be stored in different communication channels or other storage types. For example, various documents and stored content items may be stored using a directory service 1022, a web portal 1024, a mailbox service 1026, an instant messaging store 1028, or a social networking site 1030. The spreadsheet function creation and use functionality described herein may use any of these types of systems or the like for enabling data utilization, as described herein. A server 135 may provide output of the spreadsheet function creation and use functionality to clients. As one example, the server 135 may be a web server providing the spreadsheet function creation and use functionality over the web. The server 135 may provide the output of the spreadsheet function creation and use functionality over the web to clients through a network 130. By way of example, the client computing device may be implemented and embodied in a personal computer 800, a tablet computing device 105 and/or a mobile computing device (e.g., a smart phone) 110, or other computing device. Any of these embodiments of the client computing device 800, 105, 110, 120, 125, 135 may obtain content from the store 1016.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method of generating a spreadsheet function, comprising:
   receiving an electronic spreadsheet document;
   displaying a first content item in the electronic spreadsheet document;
   receiving a selection on the first content item, followed by a movement of a representation of the first content item to a formula bar associated with the electronic spreadsheet document;
   displaying a cell reference in the formula bar, the cell reference being a cell reference corresponding to a location of the first content item in the electronic spreadsheet document; and
   automatically displaying one or more spreadsheet function syntax components in the formula bar in association with the cell reference for building a spreadsheet function for operation on the first content item.

2. The method of claim 1, further comprising, automatically applying the spreadsheet function comprised of the one or more spreadsheet function syntax components and the cell reference to the first content item.

3. The method of claim 1, wherein during the movement of a representation of the first content item to the formula bar, maintaining the first content item in the location of the first content item in the electronic spreadsheet document.

4. The method of claim 1, wherein the movement of the representation of the first content item to the formula bar includes displaying movement of a ghosted representation of the first content item from the location of the first content item in the electronic spreadsheet document to the formula bar.

5. The method of claim 1, wherein the movement of the representation of the first content item to the formula bar includes a dragging of the representation of the first content item from the location of the first content item in the electronic spreadsheet document and a dropping of the representation of the first content item in the formula bar.

6. The method of claim 1, wherein automatically displaying one or more spreadsheet function syntax components in association with the cell reference includes automatically displaying a ghosted version of one or more spreadsheet function syntax components.

7. The method of claim 1, further comprising receiving a selection on a second content item contained in the electronic spreadsheet document and displaying a cell reference in the formula bar corresponding to a location of the second content item.

8. The method of claim 7, further comprising automatically displaying one or more spreadsheet function syntax components in association with the cell reference corresponding to the location of the second content item for building a spreadsheet function for operation on the first and second content items.

9. The method of claim 1, wherein displaying a first content item in the electronic spreadsheet document includes displaying a first collection of content items, and wherein receiving the selection on the first content item followed by a movement of a representation of the first content item to a formula bar includes receiving a selection on the first collection of content items followed by a movement of a representation of the first collection of content items to the formula bar.

10. The method of claim 9, wherein displaying a cell reference in the formula bar includes displaying a cell reference in the formula bar corresponding to a location of the first collection of content items.

11. The method of claim 10, further comprising;
receiving a selection on a second collection of content items contained in the electronic spreadsheet document and displaying a cell reference in the formula bar corresponding to a location of the second collection of content items; and
wherein automatically displaying one or more spreadsheet function syntax components in the formula bar in association with the cell reference for building a spreadsheet function for operation on the first content item includes automatically displaying one or more spreadsheet function syntax components in the formula bar in association with the cell reference corresponding to a location of the first collection of content items and in association with the cell reference corresponding to a location of the second collection of content items for building a spreadsheet function for operation on the first and second collection of content items.

12. The method of claim 1, further comprising displaying a help pane in association with the electronic spreadsheet document for providing via the help pane one or more help resources in association with operation of a desired component of the electronic spreadsheet document.

13. A system for generating a spreadsheet function, comprising
a processing unit; and
a memory including computer-executable instructions which when executed by the processing unit, cause the system to be operative to:
receive an electronic spreadsheet document;
display a first content item in the electronic spreadsheet document;
receive a selection on the first content item, followed by a movement of a representation of the first content item to a formula bar associated with the electronic spreadsheet document;
display a cell reference in the formula bar, the cell reference being a cell reference corresponding to a location of the first content item in the electronic spreadsheet document; and
automatically display one or more spreadsheet function syntax components in the formula bar in association with the cell reference for building a spreadsheet function for operation on the first content item.

14. The system of claim 13, wherein the system is further operative to:
automatically apply the spreadsheet function comprised of the one or more spreadsheet function syntax components and the cell reference to the first content item.

15. The system of claim 13, wherein the system is further operative to:
maintain the first content item in the location of the first content item in the electronic spreadsheet document during the movement of a representation of the first content item to the formula bar.

16. The system of claim 13, wherein the movement of the representation of the first content item to the formula bar includes displaying movement of a ghosted representation of the first content item from the location of the first content item in the electronic spreadsheet document to the formula bar.

17. The system of claim 13, wherein the movement of the representation of the first content item to the formula bar includes a dragging of the representation of the first content item from the location of the first content item in the electronic spreadsheet document and a dropping of the representation of the first content item in the formula bar.

18. The system of claim 13, wherein automatically display one or more spreadsheet function syntax components in association with the cell reference includes to automatically display a ghosted version of one or more spreadsheet function syntax components.

19. The system of claim 13, wherein the system is further operative to:
receive a selection on a second content item contained in the electronic spreadsheet document and displaying a cell reference in the formula bar corresponding to a location of the second content item.

20. The system of claim 19, wherein the system is further operative to:
automatically display one or more spreadsheet function syntax components in association with the cell reference corresponding to the location of the second content item for building a spreadsheet function for operation on the first and second content items.

* * * * *